(12) United States Patent
Luedtke

(10) Patent No.: US 7,249,038 B2
(45) Date of Patent: Jul. 24, 2007

(54) ONLINE METHOD FOR BINDING AUTOMATIC TYPE REINSURANCE

(75) Inventor: Mitchell Luedtke, Overland Park, KS (US)

(73) Assignee: Employers Reinsurance Corporation, Overland Park, KS (US)

( * ) Notice: Subject to any disclaimer, the term of this patent is extended or adjusted under 35 U.S.C. 154(b) by 970 days.

(21) Appl. No.: 09/682,106

(22) Filed: Jul. 20, 2001

(65) Prior Publication Data
US 2003/0018497 A1 Jan. 23, 2003

(51) Int. Cl.
*G06Q 40/00* (2006.01)
(52) U.S. Cl. .............................. 705/4; 705/37
(58) Field of Classification Search .................... 705/4
See application file for complete search history.

(56) References Cited

U.S. PATENT DOCUMENTS

| | | | |
|---|---|---|---|
| 4,831,526 A | 5/1989 | Luchs et al. .................... 705/4 |
| 4,837,693 A | 6/1989 | Schotz ............................ 705/4 |
| 5,191,522 A * | 3/1993 | Bosco et al. .................... 705/4 |
| 5,692,501 A | 12/1997 | Mintrun ....................... 600/301 |
| 5,704,045 A | 12/1997 | King et al. ..................... 705/35 |
| 5,806,042 A * | 9/1998 | Kelly et al. ..................... 705/4 |
| 5,809,478 A | 9/1998 | Greco et al. .................... 705/4 |
| 5,873,066 A * | 2/1999 | Underwood et al. ............ 705/4 |
| 5,970,479 A | 10/1999 | Shepherd ....................... 705/37 |
| 6,049,772 A | 4/2000 | Payne et al. .................... 705/4 |
| 6,049,773 A | 4/2000 | McCormack et al. .......... 705/4 |
| 6,112,189 A | 8/2000 | Rickard et al. ........... 705/36 R |
| 6,119,093 A | 9/2000 | Walker et al. .................. 705/4 |
| 6,134,536 A | 10/2000 | Shepherd ....................... 707/4 |
| 6,163,770 A | 12/2000 | Gamble et al. ................. 705/4 |
| 2002/0046066 A1* | 4/2002 | Laurenzano .................... 705/4 |
| 2002/0143583 A1* | 10/2002 | Reader et al. .................. 705/4 |
| 2002/0143584 A1* | 10/2002 | Lundegren .................... 705/4 |
| 2003/0093302 A1* | 5/2003 | Quido et al. .................... 705/4 |

OTHER PUBLICATIONS

Reinsurance goes virtual at General Life by Greg Mac Sweeney. Insurance & Technology. New York : Dec. 1999. vol. 24, Iss. 13; p. 19, 1pgs; pp. 1-3.*

Business Insurance Cedents not eager to buy online by Sally Roberts. Business Insurance. Chicago: Aug. 28, 2000. vol. 34, Iss. 35; p. 3, 3pgs; pp. 1-5.*

* cited by examiner

*Primary Examiner*—Andrew Joseph Rudy
*Assistant Examiner*—Vanel Frenel
(74) *Attorney, Agent, or Firm*—Armstrong Teasdale LLP

(57) ABSTRACT

A computer system and process for facilitating the administration of a facultative automatic reinsurance agreement through the generation of draft and final bordereaux. Information regarding insurance policies to be reinsured, including its terms, are entered into a database in the computer system. The terms of the insurance are compared versus reinsurance criteria which establishes the guidelines for what types of primary insurance is subject to reinsurance per the agreement. If the policy terms comply with the reinsurance criteria, information regarding the policy may be included on a draft bordereau. If the policy terms do not comply, the cedant is prompted to seek a special acceptance to allow the policy to be entitled to automatic insurance coverage.

15 Claims, 14 Drawing Sheets

AUTOMATIC AGREEMENT ADMINISTRATION PAGE
FOR REINSURANCE UNDERWRITER

| AGREEMENT # | AGREEMENT NAME | CEDANT | EFF DATE | EXP DATE | STATUS |
|---|---|---|---|---|---|
| ○ NR101 | NR AUTO | NATIONAL RELIABLE | 04/01/01 | UNTIL CANCELLED | BOUND |
| ⦿ NR102 | NR UMBRELLA | NATIONAL RELIABLE | 05/01/01 | UNTIL CANCELLED | IN PROCESS |
| ○ TI101 | TI AUTO | TRUCK INSURERS | 01/01/01 | UNTIL CANCELLED | BOUND |
| ○ XY101 | XY UMBRELLA | XYZ INSURANCE | 03/01/01 | UNTIL CANCELLED | BOUND |

[ NEW AGREEMENT ] [ VIEW AGREEMENT PROFILE ] [ CESSION PROCESSING ] [ BORDEREAU PROCESSING ]

[ LOGOUT ]

*FIG. 5.*

CEDANT'S DETAILED CESSION SCREEN

Agreement Number: NR UMBRELLA    Agreement #: NR102

Ceding Company: NATIONAL RELIABLE INC.

Cession Information

Insured: XYZ INC.    Policy #: 15186    Transaction Type: NEW ▼

Effective Date: 07/01/01 ▼    Expiration Date: 07/01/02 ▼    Bordereau Reporting Month: JUL ▼

Cession Status: PENDING    Special Acceptance: N

Ceding Commission: 30 %    Minimum Premium: $1000 per million

| Re-ins. % | Re-ins. Limit | Attachment | Gross Layer Premium | Gross Ceded Premium | Net Ceded Premium |
|---|---|---|---|---|---|
| 95 | 1,000,000 | Primary | 1500 | 1425 | 997.50 |
| 100 | 1,000,000 | 1,000,000 | 1000 | 1000 | 700.00 |
| Total | 2,000,000 | | 2500 | 2425 | 1697.50 |

[Calculate]    Cedant Premium: $75    Cedent Commission: $727.50

Comments: [ ]

[Save Cession]  [Send E-Mail]  [Print]  [Attach A File]

[Initiate Special Acceptance]    [Additional Information]

[Cession Processing]  [Bordereau Processing]  [View Agreement Profile]  [Logout]

FIG. 10.

REINSURER'S DETAILED CESSION SCREEN

Agreement Number: NR UMBRELLA    Agreement #: NR102

Ceding Company: NATIONAL RELIABLE INC.

Cession Information

Insured: XYZ INC.    Policy #: 15186    Transaction Type: NEW ▼

Effective Date: 07/01/01 ▼    Expiration Date: 07/01/02 ▼    Bordereau Reporting Month: JUL ▼

Cession Status: PENDING    Special Acceptance: N

Ceding Commission: 30 %    Minimum Premium: $1000 per million

| Re-ins. % | Re-ins. Limit | Attachment | Gross Layer Premium | Gross Ceded Premium | Net Ceded Premium |
|---|---|---|---|---|---|
| 95 | 1,000,000 | Primary | 1500 | 1425 | 997.50 |
| 100 | 1,000,000 | 1,000,000 | 1000 | 1000 | 700.00 |
| Total | 2,000,000 | | 2500 | 2425 | 1697.50 |

( Calculate )    Cedant Premium: $75    Cedent Commission: $727.50

Comments: [                    ]

( Save Cession )  ( Send E-Mail )  ( Print )  ( Attach A File )

( Approve S. A. )  ( Disapprove S. A. )  ( Request Info )

( Cession Processing )  ( Bordereau Processing )  ( View Agreement Profile )  ( Logout )

*FIG. 11.*

ONLINE METHOD FOR BINDING AUTOMATIC TYPE REINSURANCE

BACKGROUND OF INVENTION

The present invention relates to methods for administering automatic type reinsurance contracts.

The purpose of insurance is to redistribute risks. Insurers or risk carriers assume portions of the risks of their customers or insureds in exchange for premiums. Insureds may also be referred to as cedants in that they cede risks to a risk carrier or insurer. Reinsurance is used by insurance companies to redistribute their exposure to other insurers. In a reinsurance agreement, an insurer, often referred to as a primary insurer, ceding company, or cedant, transfers or cedes some or all of its exposures and premiums to a reinsurer. The reinsurer then agrees to indemnify the ceding company for a predetermined type and amount of losses sustained. In general terms, any party that transfers risk, through either a primary insurance policy or a reinsurance contract may be referred to as a cedant or a ceding party.

There are two broad types of reinsurance contracts: treaty and facultative. Treaty reinsurance involves an agreement in which the primary insurer agrees in advance to cede certain classes of business or types of insurance to the reinsurer. Under a treaty reinsurance contract, the reinsurer agrees to reinsure some portion of the risk of all of the primary insurer's insurance contracts related to a particular line of business or type of insurance. Individual risks are not underwritten or discussed. The reinsurer relies on the primary insurer to accept only risks that fall within acceptable underwriting criteria and reinsures all risks that fall within the reinsurance treaty agreement. On the other hand, facultative reinsurance involves separate reinsurance agreements for each risk or policy that is being reinsured.

Automatic facultative reinsurance is generally a hybrid between treaty type and facultative reinsurance. Automatic facultative or facultative automatic reinsurance describes a reinsurance program or agreement in which the parties establish in advance criteria (reinsurance criteria) for the types of risks or classes of business to be reinsured which will be automatically covered by the reinsurance agreement, without further underwriting by the reinsurer, and at the election of the primary insurer or ceding party. The criteria established usually relate to the amount of coverage for any risk to be reinsured, the term of coverage, ceding commissions and premiums.

Although treaty type reinsurance usually offers the best rates, reinsurer's are unwilling to provide such reinsurance if the size of the classes of business at issue is too small. In treaty type reinsurance, the underwriting focuses on the performance and underwriting expertise of the primary insurer as a whole for a particular class of business. Whereas with facultative automatic type coverage, more specific underwriting is performed through the establishment of the reinsurance criteria for the ceded policies which will be reinsured.

In treaty type reinsurance, the treaty typically covers all policies written by the primary insurer in the classes of business covered. In facultative automatic arrangements, the primary insurer may have the option of deciding whether or not to cede certain risks or policies.

Under facultative automatic reinsurance agreements, the primary insurer must periodically provide a report to the reinsurer identifying those policies it wants to be reinsured. This report is typically referred to as a bordereau. Any primary insurance contracts listed on the bordereau which meet the criteria of the facultative automatic agreement are then automatically covered or bound. In performing under a facultative automatic agreement, the primary insurer (also referred to as reinsured) remits to the reinsurer, the percentage of premiums it is entitled to under the agreement, less any ceding commission retained by the primary insurer.

Facultative automatic reinsurance agreements also typically permit a primary reinsurer to try to obtain reinsurance coverage for a policy under the automatic agreement even though it does not meet all of the established criteria. The process for doing so, is often referred to as making a request for special acceptance. In such a situation, the cedant submits to the reinsurance underwriter information and remarks to support its request for the special acceptance of the primary insurance policy under the facultative automatic agreement even though not all of the reinsurance criteria are met. The underwriter can accept or deny such a request. The process for doing so typically involves written correspondence, faxes and phone calls.

The primary insurer and the reinsurer generally maintain separate systems for monitoring which primary insurance policies are covered by the facultative automatic reinsurance agreement.

SUMMARY OF INVENTION

The present invention provides an interactive system in which a primary insurer or reinsured may bind coverage of primary insurance policies under a facultative automatic reinsurance agreement through the interactive generation and submission of bordereaux and through which the reinsurer and reinsured may monitor the status of coverage for each of the policies submitted for automatic coverage. The system also performs preliminary auditing functions in ensuring that policies submitted for automatic coverage on the bordereau meet the reinsurance criteria established by the facultative automatic agreement.

The method is conducted through a computer system including a database for storing pertinent data and information and one or more computers or servers on which programs or software for implementing the methodology are run. The computers or servers are accessible through a computer network and the software run thereon. The software generates screens, generally in the form of web pages through which information and data concerning the administration of the facultative automatic agreement may be collected and displayed. Security measures are included to prevent malicious or unintended corruption of the reinsurer's data, divulging customer or client information to unauthorized parties, and the like. The method facilitates and expedites the process of generating and processing information on bordereaux for binding reinsurance coverage under a facultative automatic agreement not only for the reinsurer but also for reinsureds.

The system is generally programmed to generate three types or sets of screens for three primary functions. The system generates a first series of screens or agreement profile screens which enable the entry into the database of reinsurance criteria established by the reinsurance agreement for determining whether reinsurance for a particular policy submitted for automatic coverage will be bound. A second series of screens or cession screens, generated by the program, facilitate the entry or updating of information regarding individual policies which the reinsured intends to cede to the reinsurer under the facultative automatic agreement. These policies to be ceded may be referred to as cessions. The information entered includes policy terms between the cedant and its insured as well as ceding terms between the cedant and the reinsurer. This information is collectively referred to as the policy and ceding terms. The program associates a status with each policy which indicates the status of the policy in relation to its being reported on a bordereau. A third set of screens or bordereau processing screens, facilitate the generation and submission of bordereaux for specific reporting periods. The bordereau processing screens can be used to generate draft bordereaux as policies are entered into the system during a reporting period, to avoid having to enter all of the eligible policies at once. Once the draft bordereau is complete and all of the cessions or policies to be included have been added to the bordereau, the draft bordereau may be submitted electronically as a final bordereau.

Information regarding a particular facultative automatic agreement, including the reinsurance criteria, is entered into the database by an underwriter for the reinsurer through an agreement profile screen. The reinsured preferably can view but not edit the information regarding the agreement, including the reinsurance criteria, through the agreement profile screen.

Information regarding an insurance policy to be ceded per the facultative automatic agreement, including policy and ceding terms, is preferably entered into the database by a reinsured through a detailed cession screen. Upon saving the information entered through the detailed cession screen, including the policy and ceding terms, the program compares the policy and ceding terms for the policy to be ceded versus the reinsurance criteria entered in through the agreement profile screens. If the policy and ceding terms for a cession match or meet the reinsurance criteria, the program assigns and associates a status of pending with the information regarding that policy stored in the database. If the policy and ceding terms for a cession do not match or meet the reinsurance criteria established by the reinsurance agreement, the program generates a message identifying the discrepancy and instructing the reinsured to either change the policy and ceding terms which do not meet the reinsurance criteria (if possible) or request a special acceptance from the reinsurer. If the cedant requests a special acceptance the program associates a status of special acceptance requested with the policy in the database.

Examples of the types of reinsurance criteria and deviations therefrom which might require a special acceptance include: whether the specified period of coverage is too long; whether the requested ceding commission is to high; whether the limit of coverage is too high; and whether the minimum premium per layer of reinsurance is too low.

The request for special acceptance is preferably sent to the reinsurer electronically. If the reinsurer accepts the request for special acceptance, the system is updated to identify the status of the cession as pending. The reinsured is then allowed to report this special acceptances cession on a bordereau through the system. If the request is denied, the status is changed to special acceptance denied and the system does not allow the reinsured to report the cession on a bordereau.

When prepared to do so, the cedant can generate a draft bordereau from the bordereau processing screens, including a bordereau summary screen and a bordereau screen. The bordereau summary screen provides a listing of all of the reinsurance agreements for the cedant previously entered into the system for administration through the system. If a bordereau previously has not been generated for a reporting period, fields are provided on the bordereau summary screen to allow the cedant to identify the reporting period and select a button, causing the program to generate a draft bordereau. In generating a draft bordereau for a reporting period for the first time, the program searches the database for all policies subject to the reinsurance agreement having the selected reporting period and having a status of pending. Selected information associated with that policy is then input or associated with a bordereau screen generated by the program. The bordereau screen generated generally comprises a listing of the qualifying policies. Upon generating the draft bordereau, the status of the policies is changed to draft.

Once a draft bordereau has been generated for a reporting period for a reinsurance agreement, the draft bordereau can be readily updated. The draft bordereau is updated by selecting the draft bordereau from the listing and clicking on an update button which causes the program to perform another search of the database for policies entered into the database after the last draft was generated, which are subject to the reinsurance agreement, have the selected reporting period and have a status of pending or draft. The information regarding these policies is then included in a listing of the relevant policies on the bordereau screen.

When the cedant believes the bordereau is complete for a particular reporting period, the cedant may submit a final bordereau by selecting a submit button on the bordereau screen. Upon submission of the final bordereau, the program changes the status of each policy to reported and sends an electronic message to the reinsurer identifying the bordereau submitted and providing a link back to the bordereau page. Selecting the link by the reinsurer regenerates the bordereau screen for the bordereau submitted including a listing of the policies included thereon. An underwriter for the reinsurer can then review the listed policies and print a copy of the bordereau for backup purposes. Accounting personnel or systems can also access information from the bordereau or the data records for the policies listed thereon for purposes of calculating and billing the cedant for premiums due under the relevant agreement.

In existing processes for submitting and receiving bordereaux any auditing of the bordereau by the reinsurer to confirm that the listed policies meet the reinsurance criteria, is done, if at all, after the bordereau is submitted. In many if not most of the cases, such auditing is infrequent and the reinsurer relies primarily on the trustworthiness and competence of the cedant in preparing and submitting the bordereau. Any errors in submissions are generally only addressed if the reinsurer realizes an error was made, which is likely to occur only if a claim for reinsurance is made on the policy.

In the system disclosed, the program steps of comparing the policy and ceding terms for a policy versus the reinsurance criteria upon entry of a policy into the system provides a process for auditing the entries of the cedant prior to submission of the bordereau. The cedant can also use the system to confirm compliance of the policies it intends to submit for automatic coverage with the reinsurance agreement, or to obtain a special acceptance on a policy before it actually binds the policy with an insured.

Objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF DRAWINGS

FIG. 5 is a diagrammatic view of an automatic agreement administration screen generated for viewing by a reinsurer using the interactive binding process including a listing of automatic agreements which may be administered using the computer system.

FIG. 10 is a diagrammatic view of a detailed cession screen accessible by a cedant to capture information regarding a cession to be submitted to the reinsurer for automatic coverage under an automatic agreement as generally shown in FIG. 9 and to initiate a request for granting of a special acceptance for a cession whose policy and ceding terms do not meet established reinsurance criteria.

FIG. 11 is a diagrammatic view of a detailed cession screen accessible by a reinsurer to view information entered into the system for a cession and to rule on any request for special acceptance.

DETAILED DESCRIPTION

As required, detailed embodiments of the present invention are disclosed herein; however, it is to be understood that the disclosed embodiments are merely exemplary of the invention, which may be embodied in various forms. Therefore, specific procedural and functional details disclosed herein are not to be interpreted as limiting, but merely as a basis for the claims and as a representative basis for teaching one skilled in the art to variously employ the present invention in virtually any appropriately detailed process or application.

Figure 1:
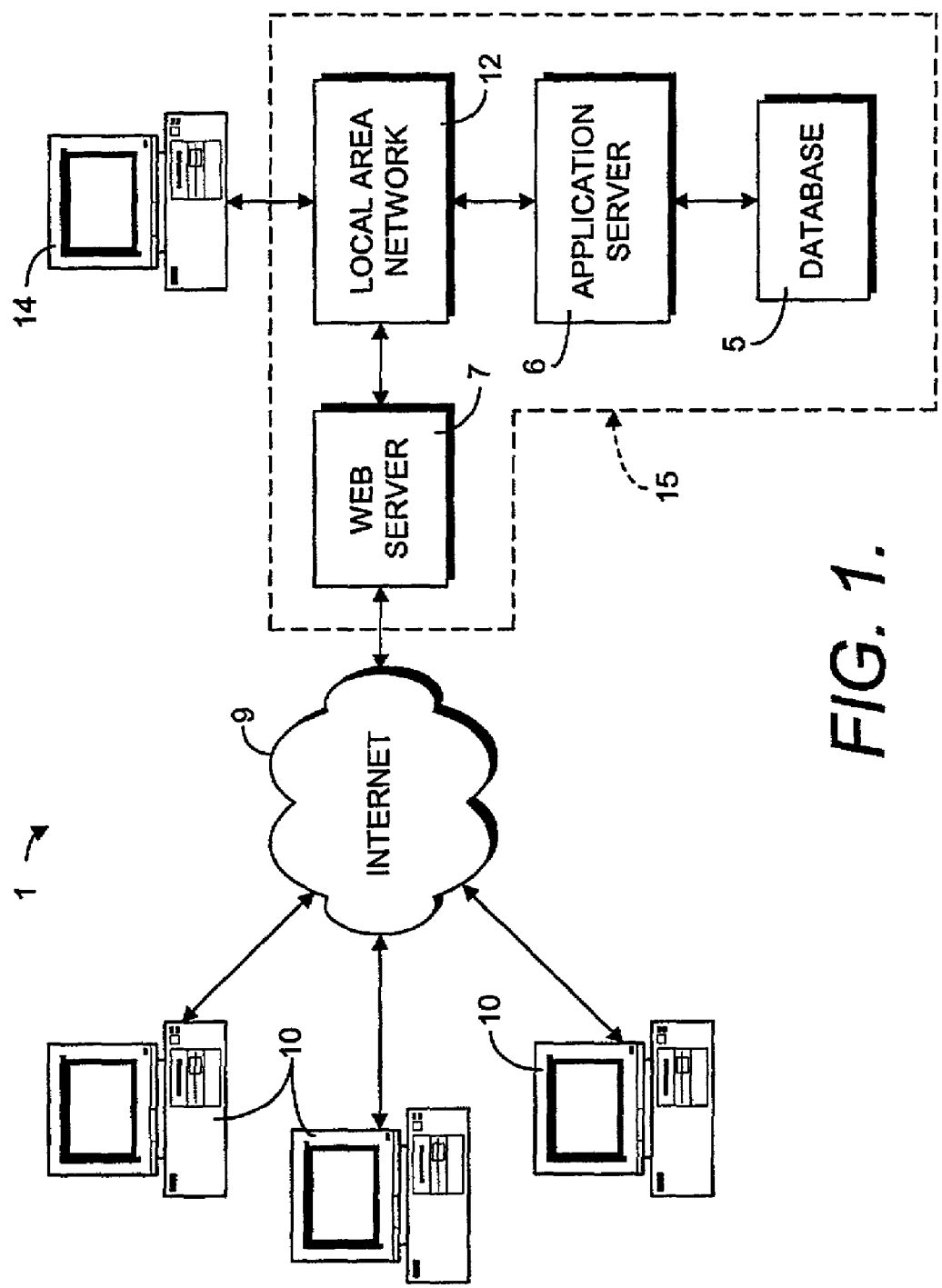
FIG. 1 is a simplified block diagram illustrating an online interconnection of a cedant with a reinsurer for practice on a computer system of an interactive binding process for binding coverage for individual primary insurance policies under an automatic reinsurance agreement.

Computer System: Referring to the drawings in more detail, FIG. 1 is illustrative of an interactive system or computer network 1 for use in carrying out the methodology of the present invention. Although the network 1 shown and described utilizes the Internet, it is to be understood that the methodology of the present invention could be practiced utilizing other computer or communications networks.

The network 1 is preferably conventional for Internet applications and includes a database 5, an application server 6 and a web server 7 which are selectively accessible by end users or customers through the internet 9 from customer computers 10. The database, application server 6 and web server 7 are selectively accessible by system administrators, underwriters or other employees of the reinsurer, including accounting personnel, through a local area network 12 from administrator computers 14. The system also preferably includes a firewall (not shown) to restrict access to the local area network 12, application server 6 and database 5.

The web server 5 and application server 6 each include central processing units (CPUs) or processors on which software or computer programs are run to generate screen displays, provide access to, collect and manipulate data for the database 5 associated with administering reinsurance contracts. As used herein the database 5, application server 6, web server 7, firewall and software or program run thereon to store, provide access to and manipulate data stored in the database 5 or on the servers 6 and 7, may collectively be referred to as a server, system server or computer system 15. The computer system 15 is generally assembled, operated, maintained and connected to the Internet 9 by or under the authority of a reinsurer.

Access to the computer system 15 is provided to employees and representatives of the reinsurer and the reinsured including managing general agents. It is to be understood that as used in the claims, an individual reinsured could serve as their own representative. The computer system 15 preferably provides security measures to prevent unauthorized access to data stored in the database 5, as by requiring a previously established account with a unique combination of an account number and password. The cedant or its representative, accesses the computer system 15 over the internet 9, through its computer 10 using a conventional internet browser, which is compatible with the web site programming of the computer system 15.

Process Overview: The computer program run on the processor generally operates to provide three separate and primary functions; agreement profiling, cession processing and bordereau processing. As will be discussed in more detail, the program generates screens which permit the capture of, manipulation of and viewing of data to permit agreement profiling, cession processing, bordereau processing and other functions provided by the computer system 15. In general, agreement profiling comprises inputting into the system 15 identifying information and reinsurance criteria regarding a facultative automatic agreement entered into between the cedant and the reinsurer. Cession processing comprises inputting into the system 15 policy and ceding terms for specific policies or cessions to be reinsured pursuant to a particular facultative automatic agreement. Cession processing also includes auditing the policy and ceding terms of a cession to confirm compliance with the reinsurance criteria established under the agreement and procedures for obtaining special acceptances for reinsurance of cessions which do not meet all of the reinsurance criteria. Boredereau processing generally comprises generating and submitting bordereaux to report cessions to be reinsured per the facultative automatic agreement.

Figure 2:
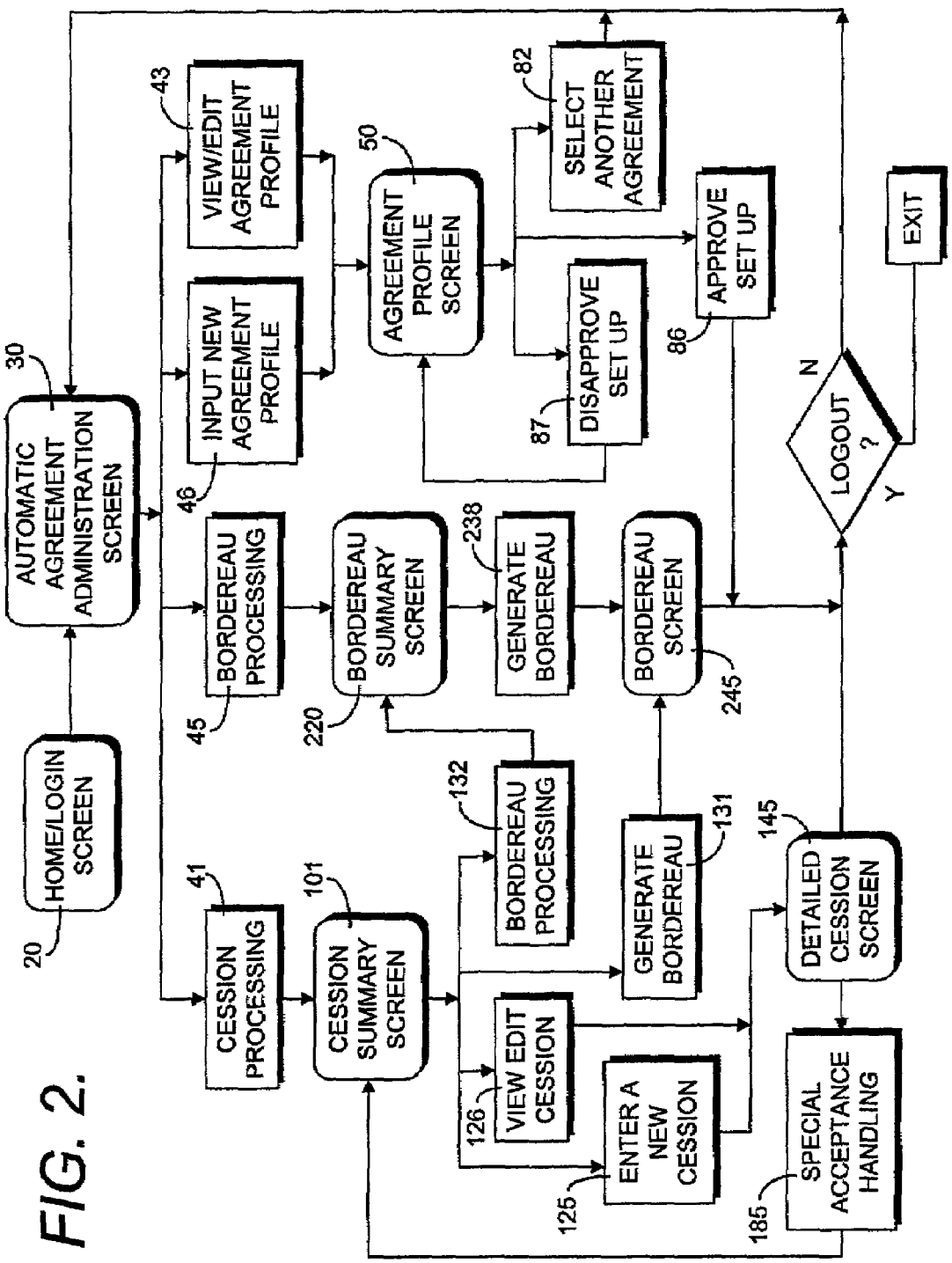
FIG. 2 is a screen flow diagram illustrating the organization of screen displays generated by a program run on the computer system and options in navigating the screen displays in the interactive binding process.
Figure 3:
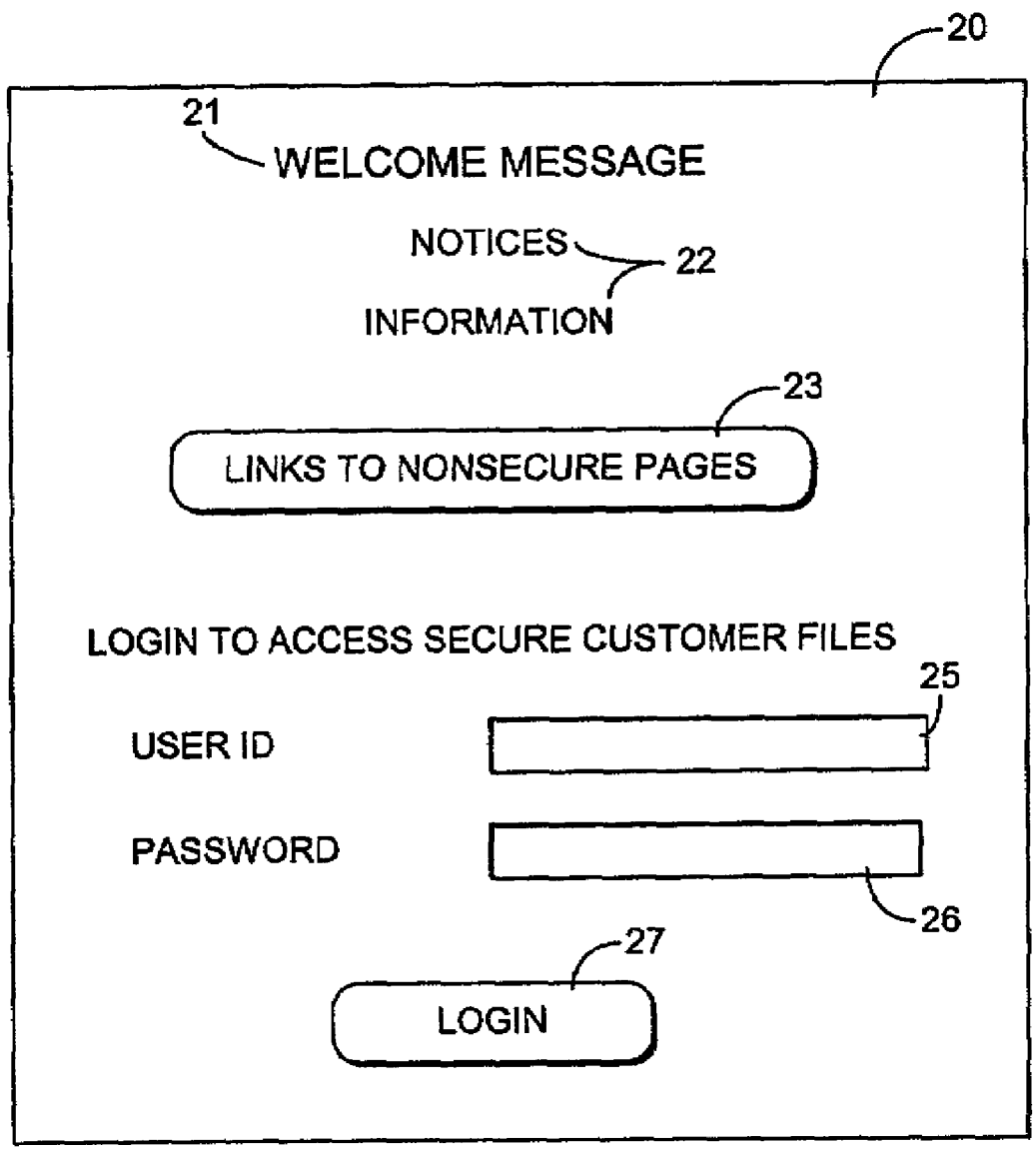
FIG. 3 is a diagrammatic view of a login screen for the interactive binding process.

FIG. 2 is a screen flow diagram, providing a general overview of the organization of the screens generated by the program in performing the functions noted above. To access the system including the data in the database 5, a user connects to a home page or login screen 20 as shown in FIG. 3. The login screen may provide a welcoming message 21, notices and other information 22 and links 23 to information on the web server 7 which does not include confidential or cedant specific information. The login screen 20 also includes a User ID space 25 and password space 26 to be filled in by the user. As used herein user may refer to either the cedant's representative or the reinsurer's underwriter accessing the system. Once the information is filled in, the user then "clicks" on a login button 27 to access user specific pages or screens. Although the screens generated by the program for viewing by the cedant and the reinsurer's representatives are similar, they are not all identical as will be shown and described. The screens shown and described herein are simplified versions of how the actual pages or screens will appear.

Figure 4:
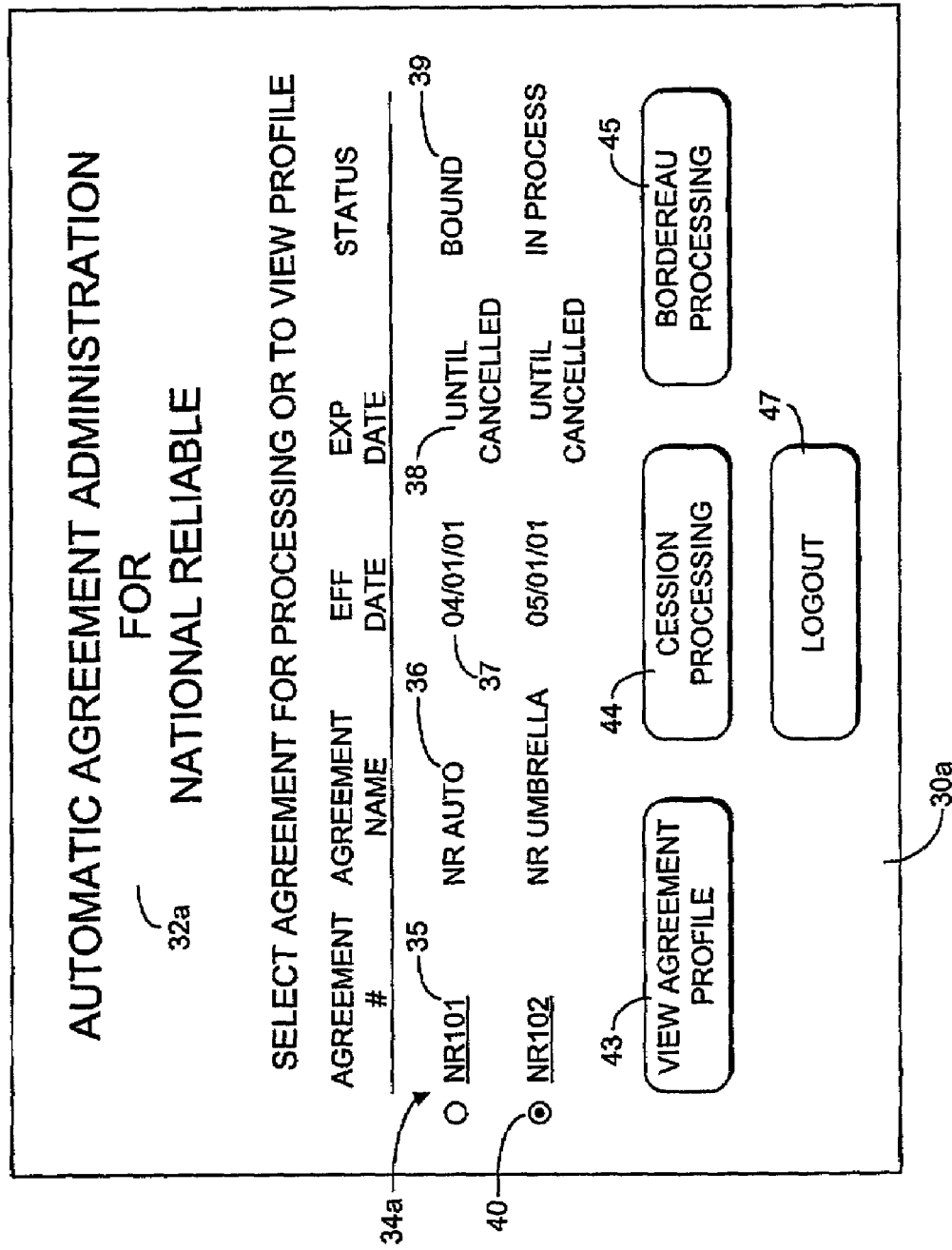
FIG. 4 is a diagrammatic view of an automatic agreement administration screen generated for viewing by a cedant using the interactive binding process including a listing of automatic agreements which may be administered using the computer system.

Agreement Administration: FIG. 4 shows an agreement administration screen 30a which is generated upon logging in by a cedant's representative. FIG. 5 shows an agreement administration screen 30b generated upon logging in by a reinsurer's representative. The agreement administration screens 30a and 30b may be collectively represented by reference numeral 30 as in the screen flow diagram of FIG. 2.

Referring to FIG. 4 it is foreseen that the agreement administration screen 30a may be customized to include the cedant's name in a header 32a. The cedant's agreement administration screen 30a includes a listing 34a of facultative automatic agreements entered into by the parties or such agreements which the parties are negotiating. The listing for each agreement includes an agreement number 35, an agreement name 36, an effective date 37, an expiration date 38, a status 39 and an agreement selection button 40. A status of "bound" indicates that the agreement has been approved by both parties and the parties are operating under the terms of the agreement. A status of "in process" indicates that the parties are in the process of negotiating the terms of the agreement but have not yet approved the agreement. Other indications of status may also be used.

The reinsurer's agreement administration screen 30b may include the name of the representative of the reinsurer in a header 32b. The reinsurer's agreement administration screen 30b includes a listing 34b of facultative automatic agreements entered into by the reinsurer and participating cedants for which the particular representative has responsibility for administering or underwriting. The listing for each agreement also includes an agreement number 35, an agreement name 36, an effective date 37, an expiration date 38, a status 39 and an agreement selection button 40. Each listing on the reinsurer's agreement administration screen 30b also preferably includes the name of the cedant 41 for each agreement.

The agreement administration screens 30 also include buttons or links to link to other pages or screens in the system. The cedant's agreement administration screen 30a includes a view agreement profile link 43, a cession processing link 44 and a bordereau processing link 45. The reinsurer's agreement administration screen includes these same links plus a new agreement link 46. Each agreement administration screen further includes a logout button or link 47 which allows the user to logout of the program on the system 15.

Figure 7:
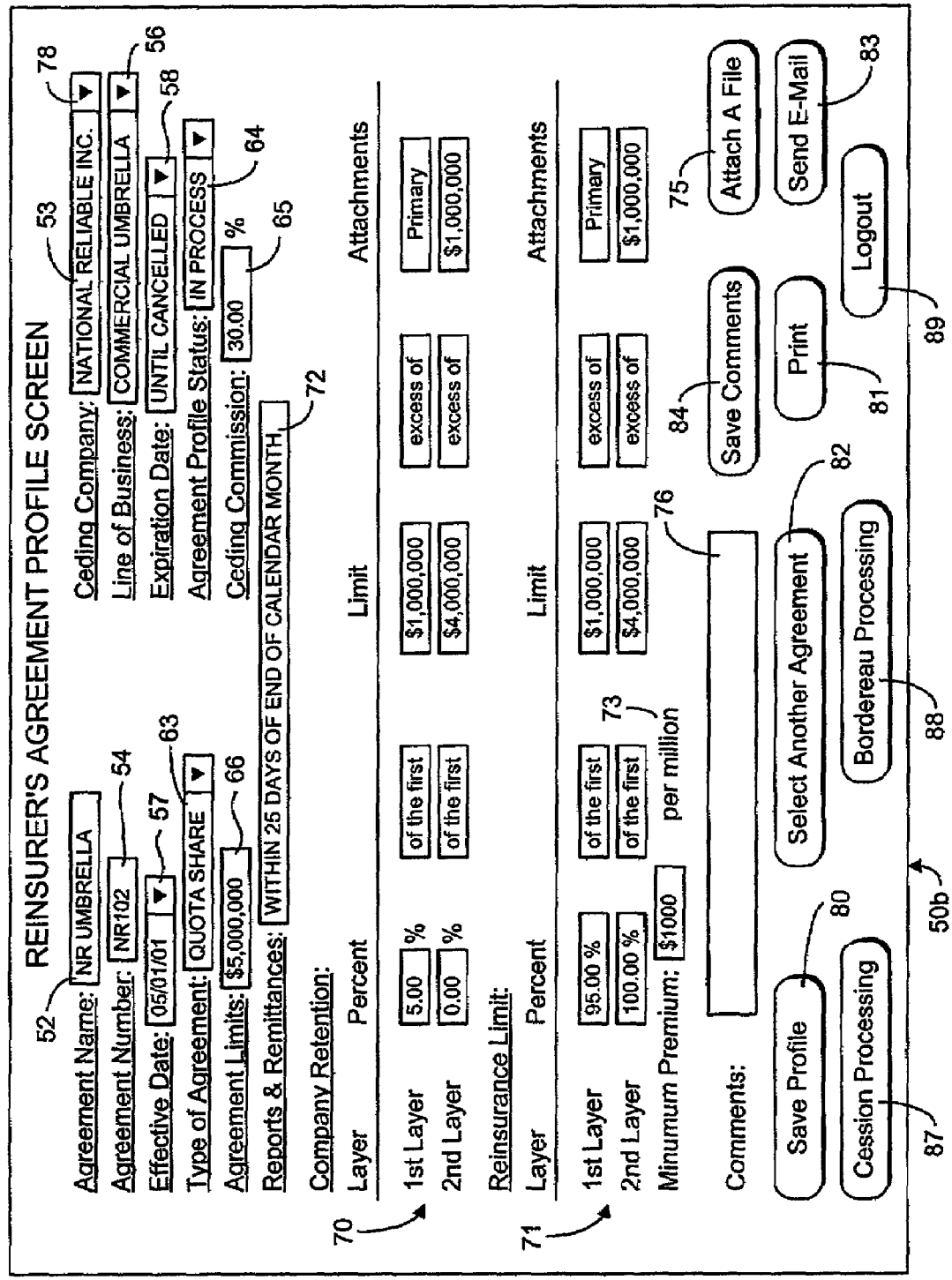
FIG. 7 is a diagrammatic view of an agreement profile screen generated for viewing by a reinsurer using the interactive binding process to enter or edit a profile entered for an automatic agreement to be administered using the computer system 15.

Agreement Profiling: Selection of or clicking on the new agreement link 46, by the reinsurance underwriter or representative, causes the program to generate an agreement profile screen 50b, as shown in FIG. 7, in which information or data regarding a new facultative automatic agreement can be collected and stored to the database 5. The information collected on the agreement profile screen 50b is used to supply the information contained in the listings 34a and 34b on the agreement administration screens 30a and 30b respectively as well as in other screens used for cession processing and bordereau processing as will be discussed subsequently.

Figure 6:
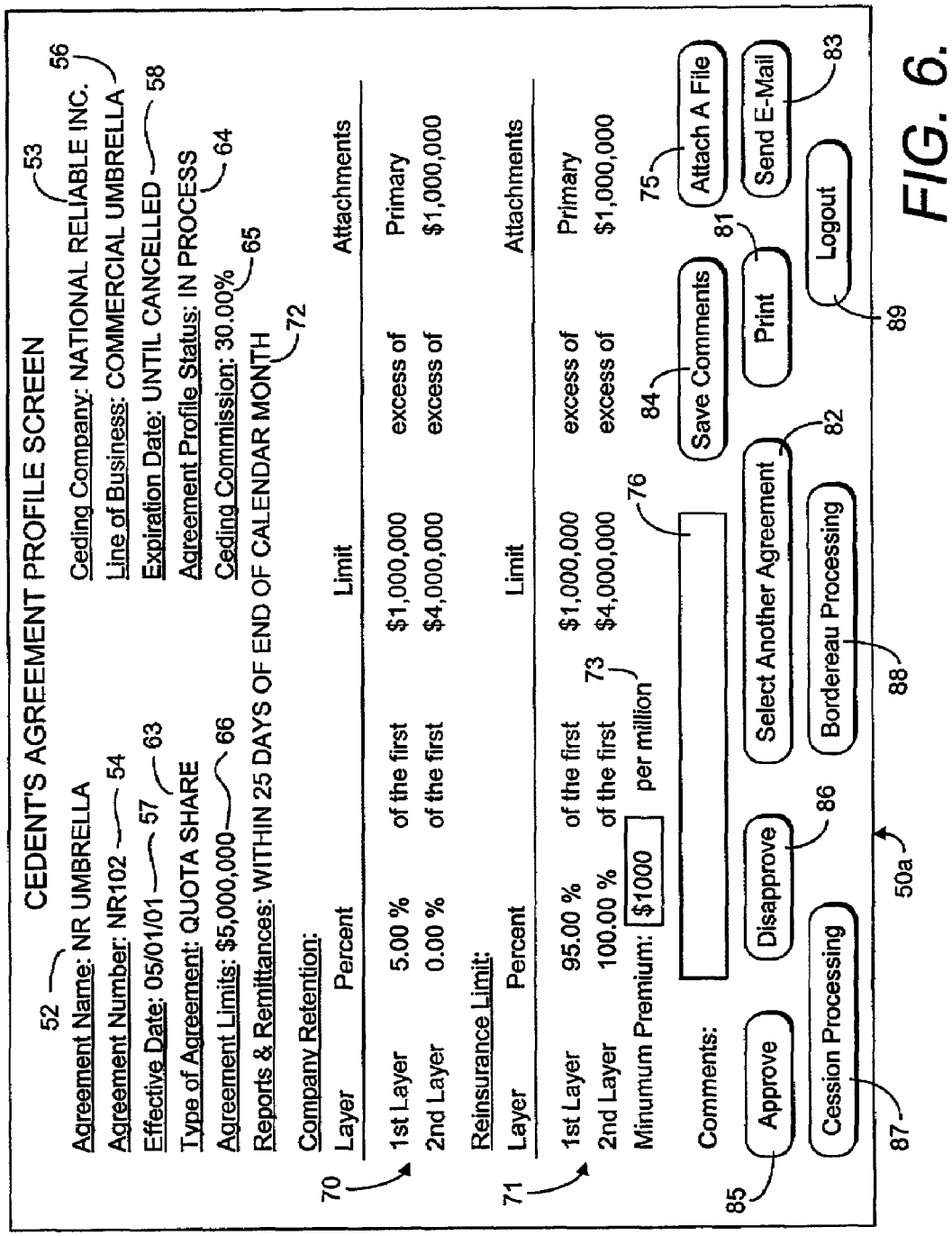
FIG. 6 is a diagrammatic view of an agreement profile screen generated for viewing by a cedant using the interactive binding process to view a profile entered for an automatic agreement to be administered using the computer system 15.

A cedant or a reinsurer can view the information already collected on an agreement profile screen 50b for a specific agreement by selecting the agreement selection button 40 for the agreement listing and then clicking on or activating the view agreement profile link 43. When a cedant clicks on the view agreement profile link 43, the program generates an agreement profile screen 50a, as shown in FIG. 6, which cannot be edited by the cedant. The agreement profile screen 50b generated for the reinsurer can be edited by the reinsurer. However, it is foreseen that the cedant's agreement profile screen 50a could be designed to permit editing by the cedant.

The cedant's agreement profile screen 50a is shown in FIG. 6 and the reinsurer's agreement profile screen 50b is shown in FIG. 7. The reference numeral 50, as used in FIG. 2, generally refers to either or both of the agreement profile screens 50a and 50b, on the agreement administration screens.

It is also noted that the agreement numbers 35 are shown formatted as hypertext links, and clicking on these links causes the system to generate a cession summary screen (described hereinafter) associated with that agreement number. It is foreseen that the agreement name could similarly function as a hypertext link.

Referring to FIG. 7, the reinsurer's agreement profile screen 50b includes spaces, boxes or fields into which the reinsurer is directed to input information corresponding to the name of the space or box. This information is then used to create the agreement profile which is stored in the database 5. The agreement profile includes identifying information for the agreement, reinsurance criteria established by the agreement to determine what primary insurance policies will be automatically covered under the agreement and information necessary to administer the agreement.

The fields include an agreement name field 52, a ceding company name field 53, an agreement number field 54, a line of business field 56, an effective date field 57, an expiration date field 58, a type of agreement field 63, an agreement profile status field 64, a ceding commission field 65, an agreement limit field 66, cedant retention per layer fields 70, reinsurance limit per layer fields 71, reports and remittance schedule field 72, and a minimum premium field 73. Many of the fields or boxes on the agreement profile screen 50b, such as the ceding company field 53, include a drop down box 78, which when selected provides a listing of options to choose from in filling in the associated field, space or box. It is also noted that the titles or descriptors for each box are formatted as hypertext links, which when activated, cause the system 15 to generate windows (not shown) containing relevant, explanatory information.

The agreement name supplied in field 52 is generally selected by the reinsurer and can be based upon an established naming convention. Although one field, field 54, is shown as provided for the agreement number, it is to be understood that the agreement profile screen 50b could be adapted to receive separate agreement numbers assigned to the agreement by the cedant and the reinsurer respectively. It is to be understood that the expiration date does not have to be a date certain and can be expressed as "until terminated".

The agreement profile status field 64 is used to indicate the status of the agreement. A status of "in process" indicates that information concerning the terms of the agreement has been entered into an agreement profile but has not yet been approved by the cedant. A status of "bound" or "approved" indicates that the cedant has reviewed the profile and determined that it is consistent with the terms of the agreement entered into by the parties. It is also foreseen that the approval process, as discussed in more detail hereafter, could be utilized to electronically facilitate the execution of the facultative automatic agreements administered by the computer system 15.

The ceding commission entered in field 65 indicates the maximum acceptable ceding commission to be paid to the cedant for ceding any risks or primary insurance policies pursuant to the facultative automatic agreement. The agreement limit entered into field 66 indicates the maximum amount of coverage under a primary insurance policy to be ceded for which reinsurance will be provided under the facultative automatic agreement.

The cedant retention per layer is detailed in fields 70. For each layer of retention, fields 70 are provided to indicate the minimum percentage of exposure to be retained by the cedant for the layer, the limit for that layer and the attachment point. The reinsurance limit per layer generally indicates the maximum potential exposure of the reinsurer per layer of coverage and is detailed in fields 71. For each layer, fields 71 are provided to indicate the maximum percentage of exposure for that layer accepted by the reinsurer, the limit of that layer and the attachment point.

As an example, consider the automatic agreement between the cedant and the reinsurer for a commercial umbrella line of business which provides for a total of $5,000,000 in reinsurance with a minimum of five percent retention by the cedant for the first $1,000,000 of reinsurance and no required retention for the next $4,000,000 of reinsurance. The first layer of reinsurance for the umbrella policies applies to claims or attaches to claims in excess of the primary insurance. The information provided in fields 70 would read as follows for the first layer: 5% of the first $1,000,000 in excess of primary. 5% being the minimum percentage retention, $1,000,000 being the limit for that layer to which the percentage applies and "primary" being the attachment point for that layer. For the second layer the information provided in fields 70 would read: 0% of the next $4,000,000 in excess of $1,000,000.

The information in fields 71 for the reinsurance limits for each layer should correspond with the information in fields 70 regarding retention. In the example noted above, the reinsurance for the first layer would be expressed as 95% of the first $1,000,000 in excess of primary. The reinsurance for the second layer would be expressed as 100% of the next $4,000,000 in excess of $1,000,000. Although only two layers are shown for fields 70 and 71 the screen would preferably be adapted to show more layers if necessary or appropriate.

The reports and remittances field 72 is used to specify the time period in which reports and remittances are due from the end of a reporting period, i.e. 25 days from the end of each calendar month. The minimum premium field 73 is used to specify the minimum acceptable premium of a ceded policy per the automatic agreement.

In addition to the data listed above and shown in FIG. 7 to be input through the agreement profile screen, other information to be collected could include an experience period, a binder received date, class codes, information on participant shares, and profit contingencies.

The reinsurer's agreement profile screen 50b also includes an attach file button 75 and a comment box 76. The attach file button 75 is used to attach or associate an electronic file with the data record for the agreement in the database 5. Any additional comments from the reinsurer can be included in the comment box 76. The reinsurer's agreement profile screen 50b also includes a save profile button 80, a print button 81, a select another agreement button 82 and an e-mail button 83.

Once the reinsurer's underwriting representative has filled in all of the required information, clicking on the save profile button 80 saves the information collected to the database 5 and associates the data with the agreement name and number. A paper copy of the agreement profile can be printed by clicking on the print button 81. Clicking on the select another agreement button 82, takes the user back to the reinsurer's automatic agreement administration screen 30b, where the user can select one of the other agreements in listing 34b and click on the view agreement profile button 43 or click on the new agreement button 46 to work on a new agreement profile. A newly saved agreement profile will be included in the listing 34b, and until approved by the cedant, the status should indicate "in process".

Returning again to the reinsurer's agreement profile screen 50b, once the reinsurer has completed and saved a particular agreement profile, the reinsurer can notify the cedant by clicking on the e-mail button 83. Clicking on the e-mail button 83 allows the reinsurer to send an e-mail message to the cedant with a link back to the agreement profile screen 50b for a specific agreement profile and with instructions for the cedant to click on the link and review and approve or disapprove the profile generated. As noted, the cedant can generate and view a cedant's agreement profile screen 50a for a specific agreement, by clicking on the link provided in an e-mail from the reinsurer or through the cedant's automatic agreement administration screen 30a as discussed previously. Similarly, the system may be programmed to prompt the reinsurer's underwriting representative to send an e-mail message to the reinsurer's accounting personnel notifying them that the agreement profile has been entered and affording the accounting personnel an opportunity to review the profile to make sure it appears acceptable and to allow the accounting personnel to update the accounting records accordingly. Any irregularities may be reported to the underwriting representative by the accounting representative through return e-mail.

The cedant's agreement profile screen 50a generally displays the same information as input by the reinsurer in the corresponding reinsurer's agreement profile screen 50b in corresponding spaces, boxes or fields. Fields, and the corresponding data entries, displayed on the cedant's agreement profile screen 50a include the agreement name field 52 (agreement name 36), the ceding company name field 53, the agreement number field 54 (agreement number 35), the line of business field 56, the effective date field 57 (effective date 37), the expiration date field 58, the type of agreement field 63, the agreement profile status field 64 (status 39), the ceding commission field 65, the agreement limit field 66, cedant retention per layer fields 70, reinsurance limit per layer fields 71, reports and remittance schedule field 72, and minimum premium field 73.

The cedant's agreement profile screen 50a also includes an attach file button 75 and a comment box 76. The attach file button 75 is used to attach or associate an electronic file with the data record for the agreement in the database 5. Any additional comments from the cedant can be included in the comment box 76. The cedant's agreement profile screen 50a also includes a print button 81, a select another agreement button 82 and an e-mail button 83 which function in similar manners as the same buttons on the reinsurer's agreement profile screen 50b.

The cedant's agreement profile screen 50a further includes a save comments button 84, an approve button 85 and a disapprove button 86. The save comments button 84 is used to save any additional comments added by the cedant with the other data related to the agreement in the database 5. The cedant can approve or disapprove the agreement profile as entered into the system by the reinsurer by selecting or clicking on the approve button 85 or the disapprove button 86 respectively. Selecting the disapprove button 86, causes the system to generate a message instructing the cedant to send an e-mail to the reinsurer identifying any changes that the cedant thinks need to be made to the agreement profile before approval. The e-mail received by the reinsurer includes a link which when selected regenerates the reinsurer's agreement profile screen 50b for the agreement at issue. The reinsurer then makes any necessary changes, saves the agreement profile again, and sends the cedant another e-mail, with a return link to the cedant's agreement profile screen, with instructions to review the agreement again or with comments why the suggested change was not made.

When the cedant selects the approve button 85, the system 15 captures the approval, saving in the database 5 the date and time and identity of cedant's representative which approved the profile. The system also changes the status of the agreement profile as indicated in status field 64 from "in process" to "bound" or "approved". The cedant can then send an email from the system with a message to the reinsurer's representative handling the matter indicating that the profile has been approved. Once an agreement profile is approved, the cedant can then use the system 15 to enter data or information regarding primary insurance policies or cessions to be ceded under the automatic agreement (cession processing) and to generate and submit bordereaux or reports on cessions to be covered (bordereau processing). The agreement profile screens 50 may also include a cession processing link 87, bordereau processing link 88 and logout button 89 functioning in the same manner as corresponding links or buttons 44, 45 and 47 on agreement administration screens 30.

Figure 8:
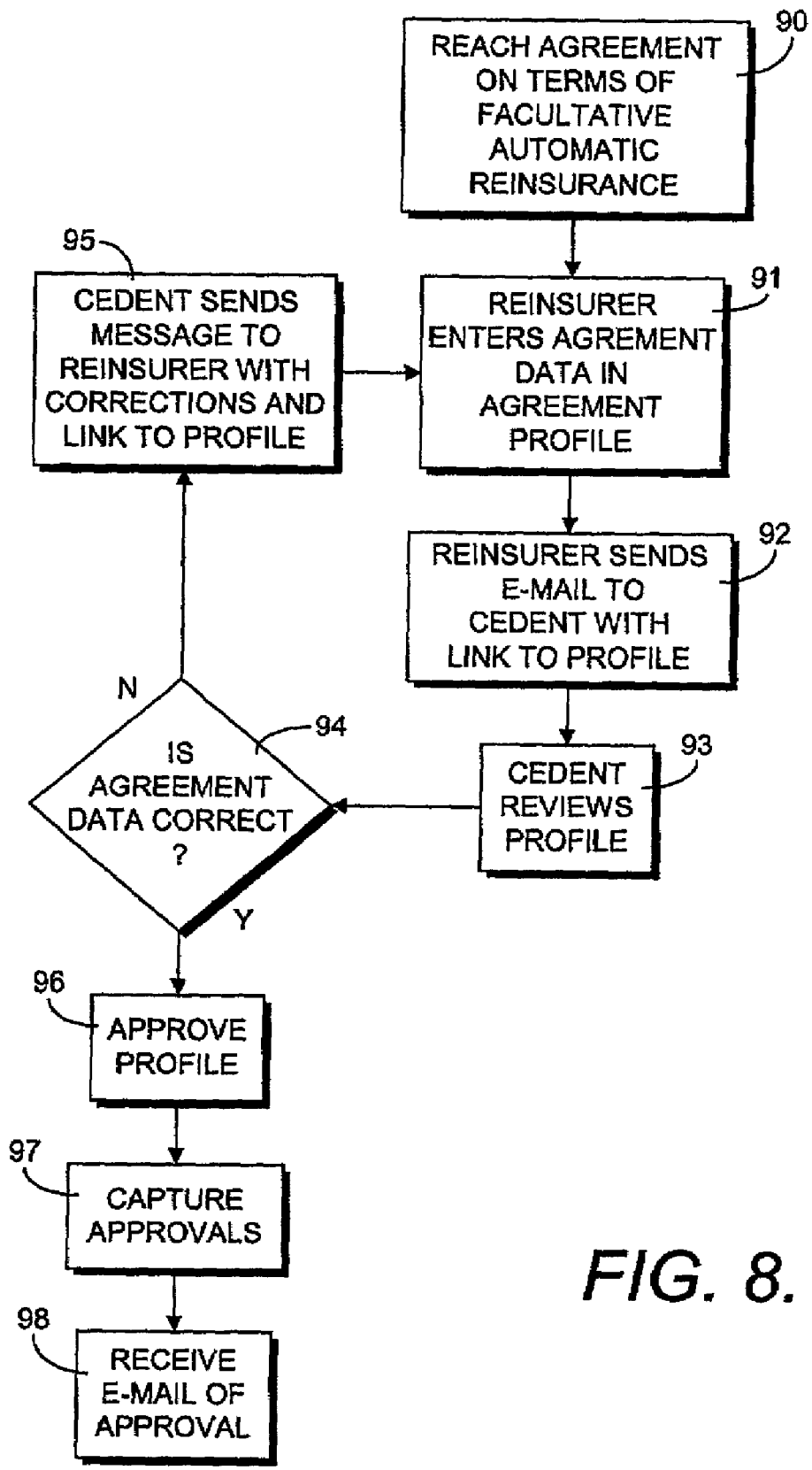
FIG. 8 is a process diagram of the principles steps in entering an agreement profile for an automatic agreement into the computer system.

FIG. 8 summarizes the primary steps of the process for creating and approving an agreement profile as described in more detail above. The process begins with the parties reaching an agreement on the terms of a facultative automatic reinsurance agreement at step 90. The reinsurer then enters data from the agreement into an agreement profile at step 91. Upon completion of the profile, the reinsurer sends the cedant an e-mail with a link to the profile and instructions to review the profile at step 92. The cedant reviews the profile at step 93. If the cedant determines at step 94 that the agreement data is incorrect, the cedant disapproves the profile and sends the reinsurer a message at step 95 indicating proposed corrections with a link back to the profile. The reinsurer then enters any necessary corrections at step 91, sends another e-mail to cedant at step 92 to initiate further review at step 93. If the cedant determines at step 94 that the agreement data is correct, the cedant approves the profile at step 96. The system then captures the approval at step 97 and the client then sends an e-mail from the system to the reinsurer's representative at step 98 noticing the approval.

As noted previously, the agreement profile screen 50b is used by the reinsurer to enter into the system 15 information relating to policy terms or ceding terms which establish the reinsurance criteria. Not all of the information entered into the system 15 through agreement profile screen 50b is considered reinsurance criteria. In addition, some of the reinsurance criteria may be programmed into the system 15 without having to be entered through an agreement profile screen 50. Reinsurance terms or ceding terms which might be used as reinsurance criteria include a maximum policy period, a maximum ceding commission, a maximum coverage limit, and a minimum premium or minimum premium per layer.

The maximum policy period is a policy term which typically is not specified in the agreement nor supplied through an agreement profile but instead is programmed into the system 15 generally as an implied term of the agreement. The reinsurance criteria of facultative automatic agreements typically will incorporate standard underwriting practices. Under typical underwriting practices any policy having a term of more than one year, would fall outside standard reinsurance criteria and would require a special acceptance to bind coverage. It is to be understood that other policy or ceding terms could also be used to establish the reinsurance criteria.

Figure 9:
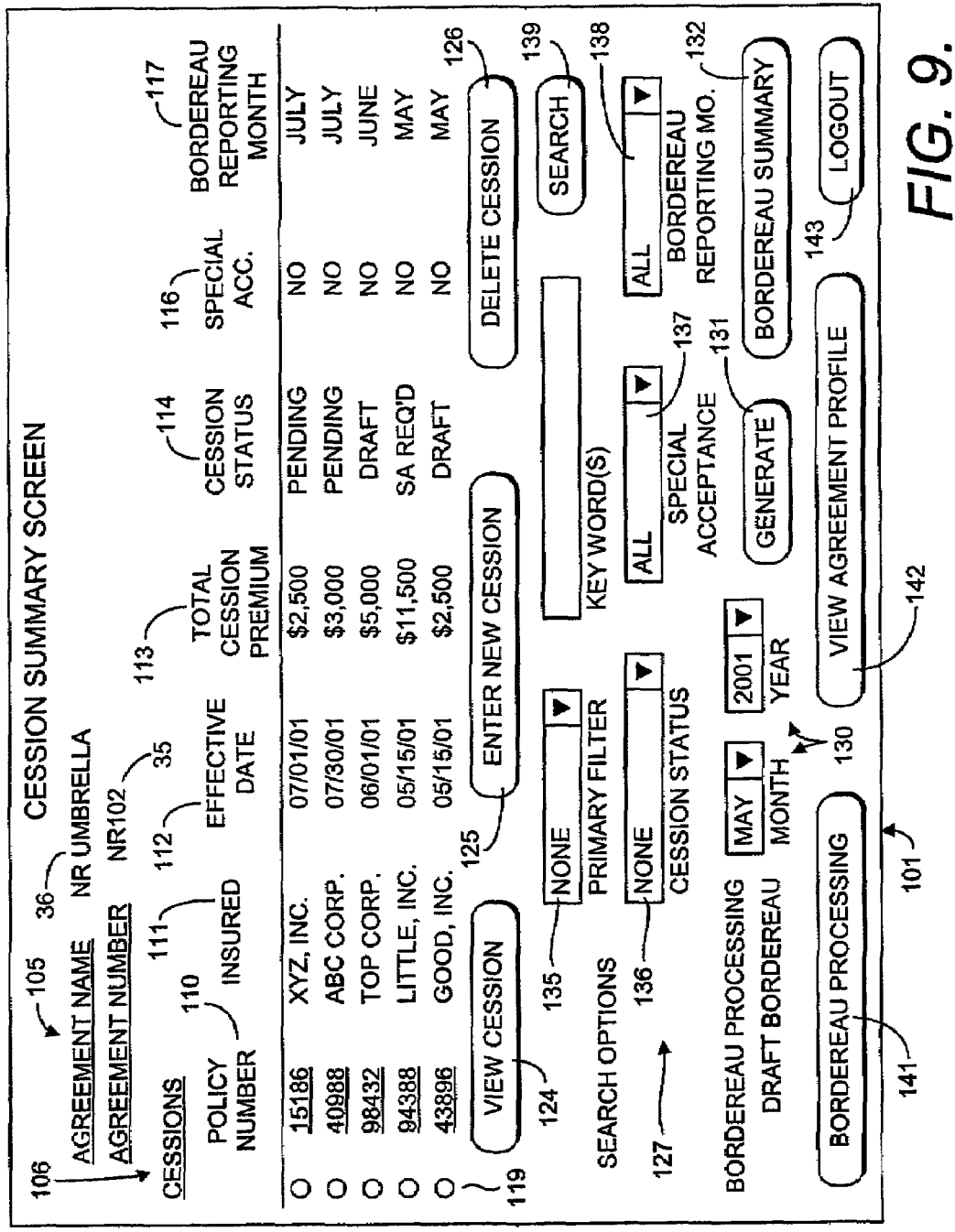
FIG. 9 is a diagrammatic view of a cession summary screen showing generated by the computer system including a listing of cessions entered into the computer system for submission on bordereaux for the associated automatic agreement.

Cession Processing Cession processing is typically initiated by the cedant through the cedant's automatic agreement administration screen 30a. The cedant selects the automatic agreement for which a cession is to be processed by clicking on or highlighting the associated button 40 and then clicking on the cession processing button 44. The system 15 then generates a cession summary screen 101 as shown in FIG. 9. The cession summary screen 101 generally appears the same to both the cedant and the reinsurer.

The cession summary screen 101 is populated from the database 5 with identifying information 105 for the automatic agreement selected and a listing 106 of any cessions for the selected automatic agreement which have previously been entered into the system 115. Typical identifying information 105 includes the agreement number 35 and agreement name 36. The identifying information may also include name of the cedant and the names of either the cedant's or reinsurer's representative responsible for administering the agreement as well as their phone and fax numbers and e-mail address.

The following information is provided for each of the cessions included in listing 106 as shown: the policy number 110, the insured's name 111, the effective date 112 of the policy, the gross ceded premium 113, the cession status 114, a transaction type (not shown), a special acceptance indicator 16 and the bordereau reporting month 117. A selection button 119 is provided for each listing to allow a user to select a listed cession for further processing.

The cession status 114 may be listed as "pending", "draft", "reported", "special acceptance requested" (or "SA requested") and "special acceptance disapproved" (or "SA disapproved"). As will be discussed in more detail hereafter, the cession status 114 is used in determining what cessions will be included on draft and final bordereaux to be generated and submitted using the system 15. The transaction type 115 generally indicates whether the cession is a new cession, a renewal, an adjustment (correcting data entry errors) a cancellation, or an endorsement (to a change in the policy). The special acceptance indicator 116 indicates whether or not a request for special acceptance has been approved, as will be discussed hereafter. The bordereau reporting month 117 indicates the month the policy or cession is to be included on a bordereau for submission to the reinsurer to bind reinsurance coverage.

The cession summary screen 101 also includes a view cession button 124, an enter new cession button 125, a delete cession button 126, cession search filters 127, bordereau generation filters 130, bordereau generation button 131 and bordereau summary button 132. The cession search filters 127 can be used to limit the listing of cessions 106 to those cessions meeting the search criteria. The search filters 127 include a primary search filter 135 which allows the user to specify the data fields in the listing it wants to search and supply search terms. The search filters 127 also include specific field filters, such as cession status filter 136, special acceptance filter 137 and a boredereau reporting month filter 138 to generate listings based upon the selected criteria for each field. Additional filters could be included to search based on transaction type, effective month or effective year or any other data field associated with the cession. Using the filters 127, a user could limit the listing of cessions 106 to only those cessions that were then pending by typing or selecting "none" in the primary filter 135, "pending" in the cession status filter 136 and "all" in the special acceptance filter 137 and the bordereau reporting month filter 138 and then clicking on a search or go button 139.

As its name implies, the delete cession button 126 may be used to delete the information regarding a selected cession from the listing 106. The delete cession button 126 allows a user to delete erroneously entered records, such as duplicate entries for cessions or cessions for primary insurance policies which may have been entered into the system 15 before being bound by the cedant and the insured then decided against purchasing the policy. To delete such a record the user clicks on the selection button 119 for the policy to be deleted and then clicks on the delete cession button 126. The system 15 preferably generates a verification window (not shown) to confirm the user's intent to delete the record before doing so.

The enter new cession button 125 allows a user, typically the cedant, to enter information regarding a new cession or policy the cedant intends to submit to the reinsurer for coverage under the facultative automatic agreement. Clicking on or activating the enter new cession button 125 causes the system 15 to generate a detailed cession screen 145. FIG. 10 shows a completed cedant's detailed cession screen 145*a* and FIG. 11 shows a completed reinsurer's detailed cession screen 145*b*.

The cession summary screen 101 may also include a bordereau processing link 141, a view agreement profile link 142 and a logout button 143. The bordereau processing link 141 links the user to bordereau processing screens which will be described in more detail hereafter. The view agreement profile link 142 generates an agreement profile screen 50 for the associated automatic agreement. And the logout button 143 allows the user to logout of the program on the system 15.

Referring again to FIGS. 10 and 11, the detailed cession screens 145 are populated with identifying information 146 regarding the facultative automatic reinsurance agreement under which the cession is to be reinsured including the agreement number 35, agreement name 36 and cedant's name 41. The detailed cession screens 145*a* and 145*b* also include data fields, boxes or spaces for entering into the system 15 identifying information for a policy or cession to be submitted for reinsurance and policy and ceding terms for that cession.

Fields for entering identifying information about the cession and policy and ceding terms include an insured name field 148, a policy number field 149, an effective date field 150, an expiration date field 151, a transaction type field 152, a bordereau reporting month field 153, a ceding commission field 154 and reinsurance layer fields 155. The reinsurance layer fields are generally presented in a table format with multiple rows to accommodate entries for multiple layers. Although rows for only two layers are shown it is to be understood that additional rows of fields could be included. Specific data fields for the reinsurance layers are generally arranged in columns and include a reinsurance percentage field 160, a reinsurance monetary limit field 161, an attachment field 162 and a gross layer premium field 163. Certain of these fields are populated with information presented in the agreement profile.

The detailed cession screens 145 also include data or information which is generated by the system 15 and supplied in appropriate titled fields including a cession status field 166, a special acceptance indication field 167, a minimum premium field 168, gross ceded premium fields 170, net ceded premium fields 171, a ceding company premium field 172 and a ceding company commission field 173. The detailed cession screens may also include additional data fields or the ability to add or delete custom data fields to incorporate additional relevant information including the currency for payment of premiums or other information pertinent to the cedant or the reinsurer. The detailed cession screens 145 also include a calculate button 175, an attach file button 177, a comments box 179, a save cession box 180, an e-mail link 181 and a print button 182. The cedant's detailed cession screen 145*a* separately includes an initiate special acceptance button 185 and an additional information button 186. The reinsurer's detailed cession screen 145*b* separately includes an approve special acceptance button 188, a disapprove special acceptance button 189 and a request information button 190.

The detailed cession screens also may include additional links for navigating the site including a cession processing link 192, bordereau processing link 193, view agreement profile link 194 and logout button or link 195. The cession processing link 192 links the user back to the cession summary screen 101. The bordereau processing link 193 links the user to bordereau processing screens which will be described in more detail hereafter. The view agreement profile link 194 generates an agreement profile screen 50 for the associated automatic agreement. And the logout button 195 allows the user to logout of the program on the system 15.

In entering a new cession, the user fills in the information required in fields 148 through 155 and fields 160 through 163 on the detailed cession screen 145. Information to be entered includes the following information concerning the policy to be ceded, the name of the insured in field 148, the policy number in field 149, the effective date and expiration date of the policy in fields 150 and 151 respectively, the transaction type in a field not shown, and the bordereau reporting month in field 153. Additional information to be entered includes the proposed ceding commission in field 154, the percent reinsurance per layer in fields 160, the reinsurance limit per layer in fields 161, the attachment point in field 162 and the gross layer premium in fields 163. Certain of these fields are populated with information from the agreement profile and can be edited by the cedant to reflect the specific terms and conditions of the policy being reported for reinsurance.

Once the user enters the data in the fields, by pressing or clicking on the calculate button 175, the user can cause the system 15 to calculate the gross ceded premium, the net ceded premium, the ceding company premium and the ceding company commission and input this data in the corresponding data fields 170 through 173. The gross ceded premium is calculated as the product of the gross layer premium times the reinsurance percent for that layer. The net ceded premium is then calculated as the gross ceded premium less the commission to be retained by the cedant for ceding the cession (net ceded premium=gross ceded premium (1−ceding commission)). The ceding company premium is calculated as the sum of the retained premiums per layer. The ceding commission is the sum of the ceding commission times the gross ceded premium per layer. The system also calculates totals for the gross ceded premium and the net ceded premium and inputs this data into fields on the detailed cession screens 145.

The status input into the cession status field 166 defaults to "pending" upon generation of a new detailed cession screen 145 (alternatively it might be left blank). Similarly the special acceptance indicator defaults to No or "N" to indicate that a special acceptance has not been approved, either because it has not been requested or it was disapproved.

The detailed cession screens 145a and 145b shown in FIGS. 10 and 11 respectively, are shown with data which corresponds to a cession being entered for coverage by the reinsurance agreement as profiled in the agreement profile screens 50 shown in FIGS. 6 and 7.

Once the user, typically the cedant, inputs the required information in the detailed cession screen 145, it clicks on or presses the save cession button 180. The system 15 then calculates any of the values not previously calculated (i.e. gross ceded premium, net ceded premium, ceding company premium, ceding company commission and policy period) and saves the calculated data and the other data from the detailed cession screen 145 to the database 5. The system 15 then performs a preliminary audit of the data entered to compare it to the reinsurance criteria. The data compared to the reinsurance criteria may be referred to as the policy and ceding terms. The policy and ceding terms generally comprise the data entered into the detailed cession screen 145 corresponding to the reinsurance criteria, which as discussed previously can include the maximum policy period, the maximum ceding commission, the maximum coverage limit, and the minimum premium per layer.

The system calculates the policy period for the cession by generally subtracting the effective date from the expiration date. Referring to FIG. 10, the policy period disclosed therein is twelve months (365 days) which is equal to and not greater than the maximum policy period programmed into the system 15. The ceding commission of thirty percent as shown as entered in field 154 in FIG. 10 is also equal to and not greater than the maximum ceding commission from the agreement profile in FIG. 7. Similarly, the coverage limit overall and per layer entered in the detailed cession screen 145 is less than that established in the agreement profile of FIG. 7. Finally, the premiums entered for each layer in the gross layer premium field 163 equal or exceed the minimum premium established in the agreement profile of FIG. 7.

As in the example described, if upon comparison of the policy and ceding terms versus the reinsurance criteria, it is determined from the comparison that all of the policy and ceding terms meet or comply with the reinsurance criteria, the system 15 returns the user to the cession summary screen 101, which should now include in listing 106 a listing for the cession just entered into the system 115. The cession status will be listed in the associated cession status field as pending and the special acceptance indicator will indicate No or "N".

However, if one or more of the policy and ceding terms does not meet or comply with the reinsurance criteria, the system 15 displays or highlights the cession data which falls outside of the reinsurance criteria. The system 15 also preferably generates a message, not shown, instructing the user to review and correct the highlighted data or initiate a request for special acceptance. If the user determines that data was entered in error, it can correct the data entry and then resubmit the data by clicking on the save cession button 180.

If the cedant as a user, wants to try to obtain a special acceptance for coverage of the policy despite its failure to meet the reinsurance criteria, the cedant can press or select the initiate special acceptance button 185. Before doing so, the cedant can enter comments into the comments box 179 or attach a file using the attach file button 177 to provide support for the request for special acceptance. Selecting the initiate special acceptance button 185 causes the system 15 to change the cession status to "special acceptance requested" and generates a preformatted e-mail message to send to the reinsurer with the request, highlighting the terms which do not meet the reinsurance criteria, and providing a link back to the detailed cession screen 145 at issue. The detailed cession screen 145 will include any of the comments entered by cedant in the comments box 179 and the reinsurer can review any supporting files attached through the attach file button 177.

If the reinsurer decides to approve the request for special acceptance, it clicks on or activates the approve special acceptance button 188. Doing so causes the system 15 to change the special acceptance indicator to Yes or "Y" and to change the cession status to "pending". The system 15 then also returns the reinsurer to the cession summary screen 101 which should now include in the listing 106 an entry for the cession for which special acceptance was approved.

If the reinsurer decides to disapprove the request for special acceptance, it clicks on or activates the disapprove special acceptance button 189. Doing so causes the system 15 to change the cession status to special acceptance disapproved and returns the reinsurer to the cession summary screen 101.

If the reinsurer decides it needs additional information before deciding whether to approve the request for special acceptance, it can select the request information button 190. Doing so causes the system 15 to generate a pre-formatted e-mail in which the reinsurer can instruct the cedant to provide additional information through the detailed cession screen 145 for which the e-mail includes a link back. Once the cedant enters any requested additional information, cedant selects or clicks on the additional information button 186 to generate a notice to be sent to the reinsurer notifying it that additional information has been provided with a link back to the detailed cession screen. The notice also includes a request for reconsideration of the request for special acceptance for approval or disapproval.

Once cession processing for a specific cession has been completed, the user is automatically returned or may return to the cession summary screen 101, by selecting the cession processing button 192. From the cession summary screen 101, the user can elect to enter another new cession or view or edit an existing cession record. To edit or view an existing cession record, the user clicks on or highlights the selection box 119 and clicks on the view cession button 124 or simply clicks on the policy number for the cession. Doing so generates a detailed cession screen 145 populated with the relevant data associated with that cession obtained from the database 5. The data can then be viewed or edited and the remaining steps in processing the detailed cession screen are essentially the same as those listed above.

Figure 12:
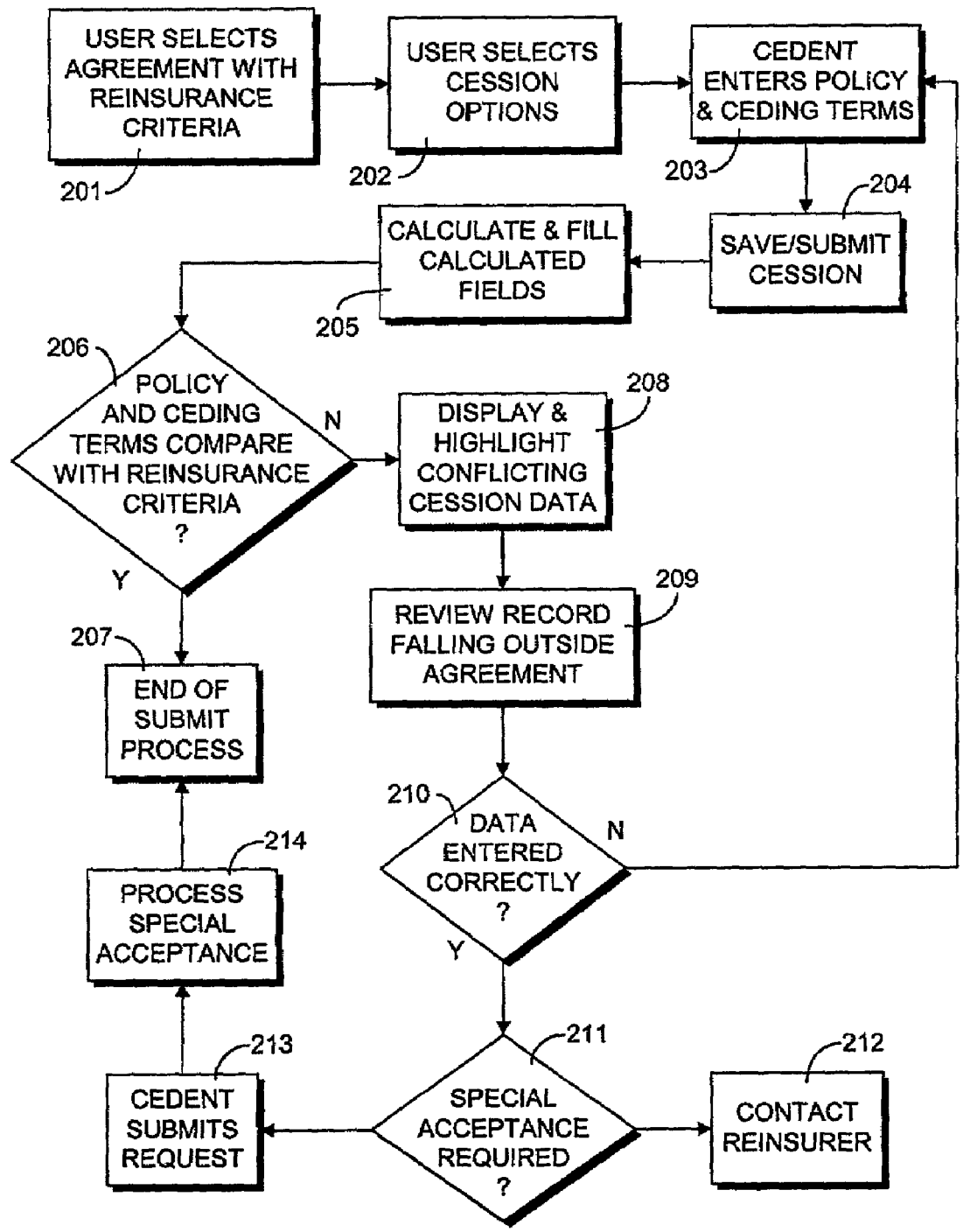
FIG. 12 is a process flow diagram of the primary steps associated with processing a cession for inclusion on a bordereau.

FIG. 12 summarizes the primary steps of cession processing. Cession processing begins with a user selecting an agreement at step 201 from the automatic agreement administration screen 30. At step 202, the user then selects an existing cession record to edit or opts to create a record for a new cession on the detailed cession screen 145. The user then enters policy and ceding terms for the cession into the system through the detailed cession screen 145 at step 203. The user then saves or submits the cession at step 204 which causes the system 15 to calculate and fill unpopulated fields at 205 and to compare the policy and ceding terms for the cession with the reinsurance criteria established by the agreement profile at step 206. If the policy and ceding terms meet or comply with the reinsurance criteria the submission process ends at step 207 and the system returns or regenerates the cession summary screen 101.

If at comparison step 206, the policy and ceding terms do not comply with the reinsurance criteria the system displays and highlights the conflicting cession data at step 208 and the user then reviews the conflicting policy and ceding terms at step 209. If it is determined at 210 that any of the data for the policy and ceding terms was entered incorrectly, the user proceeds to step 203 to reenter or correct the data. If it is determined that the data was entered correctly, then a determination is made by the cedant at 211 whether a special acceptance is required. If the cedant determines at 211 that special acceptance is not required it can contact the reinsurer at step 212 to determine why the comparison at step 206 found noncompliant policy and ceding terms.

If it is determined at 211 that special acceptance is required, the cedant submits a request for special acceptance at 213 and the request is processed at step 214. The processing step 214 includes making a determination by the reinsurer whether to approve or disapprove the request for special acceptance. After the processing step, cession processing ends at 207 and the user is returned to the cession summary screen 101. The user can also return to the cession summary screen 101 by clicking on the cession processing link 192.

Figure 13:
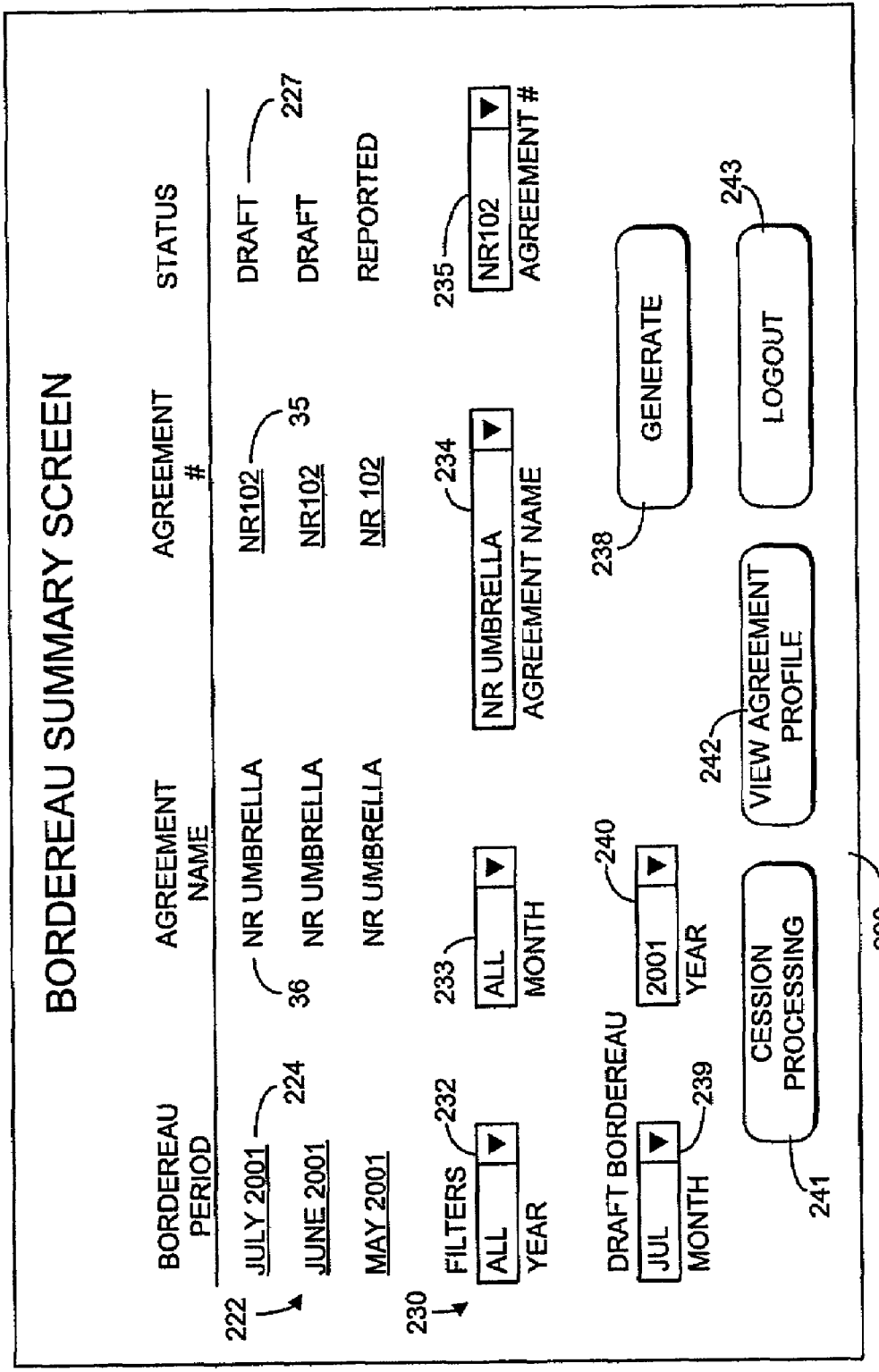
FIG. 13 is a diagrammatic view of a bordereau summary screen including a listing of bordereaux and their respective bordereau reporting periods adapted for use in generating and updating selected bordereau.

Bordereau Processing: The process for preparing a bordereau can be initiated from either the cession summary screen 101 or back through the automatic agreement administration screen 30. From the cession summary screen 101, selecting the bordereau summary button 132, causes the system 15 to generate a bordereau summary screen or bordereau processing screen 220 as shown in FIG. 13. The bordereau summary screen 220 generated from the cession summary screen 101, includes a listing of bordereaux 222, in either draft or final form, which have been previously generated by the system for the automatic agreement on which the user had been working through the cession summary screen 101. The bordereau summary screen 220 may also be generated from the automatic agreement administration screen 30 by selecting the agreement selection button 40 associated with the agreement for which a bordereau is to be generated and then clicking on the bordereau processing or bordereau summary link 45.

Referring again to the bordereau summary screen shown in FIG. 13, the listing for each agreement includes the bordereau period or bordereau reporting period 224, the agreement name 36, the agreement number 35 and the bordereau status 227. The bordereau period is the calendar reporting period for the bordereau, typically on a monthly basis. A boredereau period 224 of July 2001 indicates the bordereau due in July 2001 for the automatic agreement at issue. The agreement name 36 and the agreement number 35 are the name and number of the automatic agreement for which the bordereau is to be generated and submitted. The bordereau status 227 is an indication of whether the bordereau is in draft form ("draft") or whether it has been reported or submitted to the reinsurer ("reported"). The information included in the bordereau listing 222 is obtained from the database 5.

The bordereau summary screen 220 includes filters 230 with which the user can select criteria for bordereaux to be included in the listing 222. The filters 230 include a year filter 232 to indicate the bordereau reporting year, a month filter 233 indicating the bordereau reporting month, an agreement name filter 234 and an agreement number filter 235. The system 15 might be programmed to default to include in the listing 222 all of the bordereaux previously generated for the automatic agreement at issue, or if this is too voluminous, the system could be programmed to default to show a listing of all bordereax generated for the agreement for the current year. To view a previously generated bordereau, the user clicks on the bordereau period 224 for the desired bordereau in the listing 222. The bordereau period 224 is programmed as a hypertext link.

The bordereau summary screen 220 also includes a generate button 238 and month and year filters 239 and 240 for use in generating a new draft boredereau. The bordereau summary screen 220 also includes a cession processing link 241, a view agreement profile link 242 and a logout button or link 243. The cession processing link 241 links the user back to the cession summary screen 101. The view agreement profile link 242 generates an agreement profile screen 50 for the associated automatic agreement. And the logout button 243 allows the user to logout of the program running on the system 15.

Figure 14:
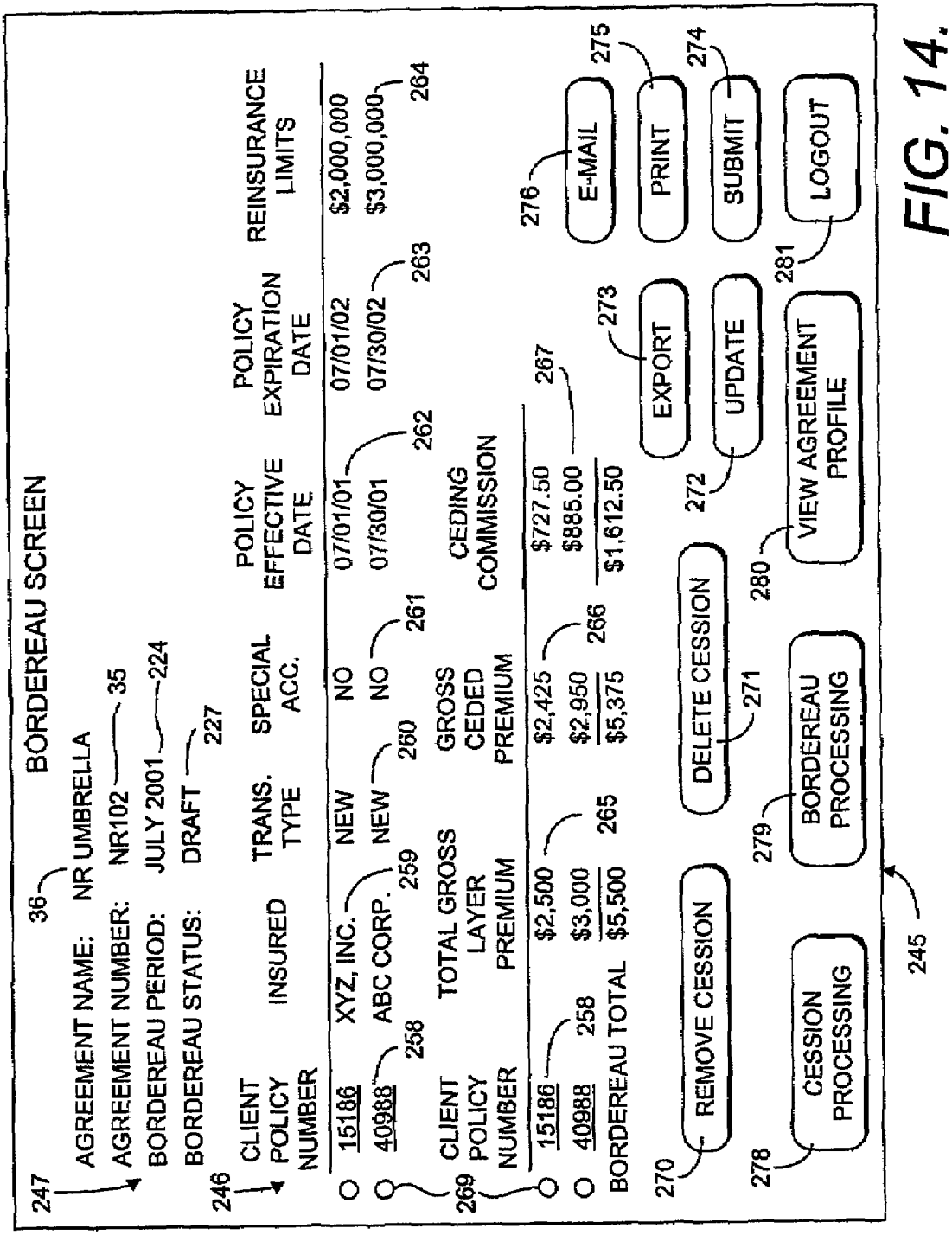
FIG. 14 is a diagrammatic view of a bordereau screen including a listing of cessions to be included on a draft or final bordereau for a specific reporting period.

To generate a new bordereau from the bordereau summary screen 220, the user selects the appropriate bordereau reporting period using the month and year filters 239 and 240 and then clicking on the generate button 238. Upon clicking the generate button 238, the system 15 generates a bordereau in the form of a bordereau screen 245, as shown in FIG. 14. The bordereau screen 245 generated by the system 15 includes a listing of cessions 246 which have previously been entered into the database 5 for the selected automatic agreement and which have a bordereau reporting period corresponding to the selected bordereau reporting period and which have a cession status of pending. Once a cession is included in a listing of cessions 246, its status is changed to draft.

The bordereau screen 245 also includes identifying information 247 for the bordereau including the name 36 and number 35 of the automatic agreement for which the bordereau is to be submitted, the bordereau reporting period 224 and the bordereau status 227. For each cession included in the listing of cessions 246, the bordereau screen 245 includes the policy number 258, the named insured 259 for the policy, the transaction type 260, a special acceptance indicator 261, a policy effective date 262, a policy expiration date 263 and other identifying information concerning the policy such as the reinsurance limit 264, the total gross layer premium 265, the gross ceded premium 266 and the ceding commission 267. A selection button 269 is also associated with each cession in the listing 246.

The bordereau screen 245 includes several buttons to facilitate bordereau processing including a remove cession button 270, a delete cession button 271, an update button 272, an export button 273, a submit button 274, a print button 275 and an e-mail button 276. A cession can be removed from a bordereau to be included in the bordereau for the next reporting period or month by first highlighting or clicking on the selection button 269 for the cession and then clicking on the remove cession button 270. Clicking on the remove cession button 270 causes the system 15 to change the bordereau reporting period to the next month or period, which then results in the removal of the cession from listing 246.

A cession can be deleted completely from the system 15 by selecting the button 269 associated with the cession then clicking on the delete cession button 271. This feature might be necessary to remove a duplicate entry.

The update button 272 is used to update a previously generated bordereau. The update button 272 would be used to generate an updated bordereau after the user generates a draft bordereau, such as the bordereau viewable on bordereau screen 246, and then returned to the cession processing screens to enter additional cessions. After additional cessions have been entered into the system with the same bordereau reporting period as the previously entered bordereau, the user returns to the bordereau summary screen and selects or clicks on the entry for the bordereau reporting period for the bordereau to be updated. This causes the system to regenerate the bordereau for the selected reporting period including in the listing of cessions 246, any cession for the agreement being administered, with the appropriate bordereau reporting period and which has a cession status of draft. Clicking on the update button 272 causes the system to further regenerate the bordereau screen 245 adding to the listing of cessions 246 any cessions which have a status of pending. The system 15, then also changes the cession status of the pending cessions to draft.

The export button 273 can be used to export the data associated with the bordereau into a different data file such as a spreadsheet. This may be useful if the same data must be submitted to another reinsurer if for example multiple reinsurer's are reinsuring the same class of business.

The print button 275 can be used to print a copy of the bordereau as it then appears on the bordereau screen 245. In the embodiment disclosed, the bordereau is not generally saved as a separate computer document, rather it is a report that is selectively generated in the manner discussed previously. Therefore, printing copies of the bordereau screens may be useful for a system user.

Once the cedant is satisfied that all of the cessions to be entered into the system for a bordereau reporting period, have been entered, and any necessary special acceptances approved, the cedant submits a final bordereau by clicking on the submit button 274. Clicking on the submit button 274 changes the cession status of each of the cessions associated with the bordereau to reported. The system also sends an e-mail message to the reinsurer indicating that a final bordereau has been submitted with a link back to the bordereau screen 245. Clicking on the link regenerates the bordereau screen 245 for the pertinent reporting period for the automatic agreement at issue.

The e-mail message is preferably sent to both an underwriter for the reinsurer to review the bordereau for correctness and to an accounting representative of the underwriter for entering the pertinent information from the cessions into the accounting system for the reinsurer. The reinsurer's accounting system then generates premium notices and invoices. It is foreseen that the computer system 15 could interface directly with the reinsurer's accounting system to automatically transfer or make accessible the pertinent data from the database 5 to the accounting system.

The bordereau summary screen 245 may also include links for navigating the website including a cession processing link 278, bordereau processing link 279, view agreement profile link 280 and logout link 281. These links have the same function as the similarly named links described above.

It is to be understood that while certain forms of the present invention have been illustrated and described herein, it is not to be limited to the specific forms or arrangement of parts described and shown. For example, as used herein the term button generally refers to a link which is activated by placing the cursor on the button and clicking the control button on an associated mouse, i.e. clicking on the button. When a button is selected or activated the system 15 links the user to or generates a different screen associated with the link. It is to be understood that linking means or screen generation means other than computer generated buttons could be utilized, including pressure sensitive buttons or voice activated links. It is also to be understood that the round selection buttons might be used to select more than one listing or entry at a time with which to perform a selected function.

It is also foreseen that at some set period prior to the policy expiration date for a cession, the system could be programmed to automatically change the status of the cession to "to be renewed" or some other indication to indicate that the cession is subject to renewal and could be included in a future bordereau. At the same time the system could be programmed to send an electronic message to the cedant notifying it of the cessions which are subject to renewal under the reinsurance agreement.

The user would probably be provided with links to the detailed cession screen for each cession to be renewed and the system would be programmed to permit the cedant to make any necessary changes to the detailed cession screen and save the revised record, or simply delete the record if reinsurance for that policy is not to be renewed under the facultative automatic agreement. Saving a revised detailed cession screen could then result in the status changing back to pending so that the cession could be included in a draft bordereau in the manner discussed previously.

It is also foreseen that the system could be adapted for use with middleware type software which would permit the system 15 to communicate directly with any database maintained by the cedant to mine the data necessary for completing the detailed cession screens. Such software generally requires a representative of the reinsurer to map out the paths to the data fields in the cedant's database that correspond to the relevant data fields in the system database 5. Use of such middleware would reduce the amount of time for users to transfer the pertinent data and should reduce the incidents of entry error.

What is claimed is:

1. A process for a reinsurer to facilitate administration of a facultative automatic reinsurance agreement between a cedant and a reinsurer using a computer system, said process comprising the steps of:

providing an automatic reinsurance agreement entered into between said cedant and said reinsurer wherein the reinsurer agrees to automatically reinsure insurance policies associated with the cedant that satisfy a reinsurance criteria, said automatic reinsurance agreement including said reinsurance criteria, said reinsurance criteria describing at least one of types of risks and classes of business to be automatically reinsured under said reinsurance agreement without further underwriting by said reinsurer;

entering said reinsurance criteria into a database using said computer system;

providing said cedant access to said database;

instructing said cedant to enter into said database, terms for each insurance policy said cedant intends to submit for coverage under said automatic reinsurance agreement, wherein said cedant submits an initial report using said computer system including each policy submitted for coverage under said automatic reinsurance agreement;

comparing said terms entered by said cedant for each insurance policy included on the initial report to said reinsurance criteria; and preventing any of said policies, for which said terms do not comply with said reinsurance criteria from being included on a final report to be submitted to said reinsurer for coverage under said automatic reinsurance agreement.

2. The process as in claim 1 wherein said step of comparing said terms entered by said cedent further comprises calculating for each insurance policy included on the initial report a gross ceded premium, a net ceded premium, a ceding company premium, and a ceding company commission.

3. A process for a reinsurer to facilitate submitting bordereaux using a computer system, each bordereau including a listing of insurance policies to be covered under a facultative automatic reinsurance agreement, said process comprising the steps of:

entering into an automatic reinsurance agreement between a cedant and a reinsurer wherein the reinsurer agrees to automatically reinsure insurance policies associated with the cedant that satisfy a reinsurance criteria, said automatic reinsurance agreement establishing said reinsurance criteria, said reinsurance criteria describing at least one of types of risks and classes of business to be automatically reinsured under said reinsurance agreement without further underwriting by said reinsurer;

entering said reinsurance criteria into a database using said computer system;

providing said cedant access to said database;

instructing said cedant to enter into said database, terms for each insurance policy said cedant intends to submit for coverage on a bordereau under said automatic reinsurance agreement, wherein said cedant submits an initial bordereau using said computer system including each policy submitted for coverage under said automatic reinsurance agreement;

comparing said terms entered by said cedant for each insurance policy included on the initial bordereau to said reinsurance criteria;

if in said comparison step, said terms comply with said reinsurance criteria, permitting said policy to be incorporated by said system on a final bordereau;

if in said comparison step, said terms do not comply with said reinsurance criteria, said computer system sending a message to said cedant noting the terms that do not comply with said reinsurance criteria and instructing said cedant to correct any errors in said terms entered in said database or submit a request that said reinsurer cover said policy under said automatic reinsurance agreement despite the non-compliance of said terms with said reinsurance criteria.

4. The process as in claim 3 wherein said terms comprise policy and ceding terms.

5. A computer system for maintaining and administering a facultative automatic type reinsurance agreement between a cedant and a reinsurer and pursuant to which reinsurance is provided for individual insurance policies, said computer system comprising:

a server including a processor;

a database connected to said processor for storing data; and a program executable on said processor:

to collect reinsurance criteria established by said reinsurance agreement and store said reinsurance criteria in said database, said reinsurance agreement previously entered into between said cedant and said reinsurer wherein the reinsurer agrees to automatically reinsure insurance policies associated with the cedant that satisfy said reinsurance criteria, said reinsurance criteria describing at least one of types of risks and classes of business to be automatically reinsured under said reinsurance agreement without further underwriting by said reinsurer;

to collect insurance policy data including policy and ceding terms regarding each individual insurance policy for which coverage is sought by said cedant under said reinsurance agreement and store said policy data in said database;

to generate an initial report including each insurance policy for which coverage is sought by said cedant under said reinsurance agreement;

to compare said policy and ceding terms for each insurance policy included on the initial report to said reinsurance criteria and determine if said policy and ceding terms comply with said reinsurance criteria; and to generate a final report including each insurance policy having policy and ceding terms that comply with said reinsurance criteria.

6. The computer system as in claim 5 wherein said program is adapted to permit a cedant to generate an initial report listing all of the individual insurance policies to be submitted to said reinsurer for coverage during a specified reporting period, wherein each insurance policy included on said initial report is then processed to determine whether said policy and ceding terms of said individual insurance policy comply with said reinsurance criteria.

7. The computer system as in claim 6 wherein said program is adapted to permit said cedant to electronically submit said initial report to said reinsurer.

8. The computer system as in claim 5 wherein said program is configured to generate said final report including generating an electronic message transmitted to said reinsurer with a link which when selected by said reinsurer generates said final report listing all of the individual insurance policies selected for submission to said reinsurer for coverage during said specified reporting period and which have been determined that said policy and ceding terms of said individual insurance policy comply with said reinsurance criteria.

9. The computer program as in claim 5 wherein if the program determines that the policy and ceding terms of a selected individual insurance policy do not comply with said reinsurance criteria, said program sends to said cedant an electronic message identifying the policy and ceding terms which do not comply with said reinsurance criteria and instructing said cedant to correct any errors in said policy and ceding terms entered in said database or to submit a request that said reinsurer cover the selected individual insurance policy under said reinsurance agreement despite the non-compliance of said policy and ceding terms with said reinsurance criteria.

10. The computer program as in claim 5 wherein:
    said program associates a status indicator with said policy data for each individual insurance policy stored in said database;
    if it is determined that said policy and ceding terms for a selected individual insurance policy comply with said reinsurance criteria said program assigns a first status with said status indicator associated with said policy data for said selected individual insurance policy in said database; and
    said program permits a cedant to generate an initial report listing all of the individual insurance policies to be submitted to said reinsurer for coverage during a specified reporting period in which said first status has been assigned to said status indicator associated with said policy data for said selected individual insurance policy in said database.

11. The computer program as in claim 10 wherein if the program determines that the policy and ceding terms of said selected individual insurance policy do not comply with said reinsurance criteria, said program sends to said cedant an electronic message identifying the policy and ceding terms which do not comply with said reinsurance criteria and instructing said cedant to correct any errors in said policy and ceding terms entered in said database or to submit a request that said reinsurer cover the selected individual insurance policy under said reinsurance agreement despite the non-compliance of said policy and ceding terms with said reinsurance criteria.

12. The program as in claim 11 wherein if a cedant submits a request that said reinsurer cover said selected individual insurance policy under said reinsurance agreement despite the non-compliance of said policy and ceding terms with said reinsurance criteria, said program assigns a second status to said status indicator associated with said policy data for said selected individual insurance policy; and said program changing said status indicator from said second status to said first status if said reinsurer approves said request for coverage of said selected individual insurance policy under said reinsurance agreement despite the non-compliance of said policy and ceding terms with said reinsurance criteria.

13. A process for preparing a bordereau for submission to a reinsurer using a computer system, said bordereau comprising a listing of individual insurance policies to be covered under a facultative automatic reinsurance agreement, said process comprising the steps of:
    providing an automatic reinsurance agreement entered into between a cedant and said reinsurer wherein said reinsurer agrees to automatically reinsure insurance policies associated with said cedant that satisfy a reinsurance criteria, said automatic reinsurance agreement including said reinsurance criteria, said reinsurance criteria describing at least one of types of risks and classes of business to be automatically reinsured under said reinsurance agreement without further underwriting by said reinsurer;
    storing said reinsurance criteria in a database coupled to said computer system;
    accessing said database using said computer system;
    entering into said database, policy and ceding terms for each insurance policy intended by said cedant to be included in said listing on said bordereau;
    causing the computer system to compare said policy and ceding terms entered into said database for each insurance policy to said reinsurance criteria to determine if said policy and ceding terms comply with said reinsurance criteria; and
    generating a bordereau using said computer system including a listing of each of said insurance policies in which said policy and ceding terms comply with said reinsurance criteria.

14. The process as in claim 13 wherein if it is determined that said policy and ceding terms for a selected individual policy do not comply with said reinsurance criteria, electronically submitting a request for acceptance to said reinsurer seeking authorization to include said selected individual policy in said listing of individual policies to be covered under said facultative automatic reinsurance agreement.

15. The process as in claim 14 wherein said step of generating through said computer system a bordereau including a listing of each of said policies in which said policy and ceding terms comply with said reinsurance criteria further includes generating such a listing including any of said individual policies in which said reinsurer has approved said request for acceptance.

* * * * *

UNITED STATES PATENT AND TRADEMARK OFFICE
CERTIFICATE OF CORRECTION

| | |
|---|---|
| PATENT NO. | : 7,249,038 B2 |
| APPLICATION NO. | : 09/682106 |
| DATED | : July 24, 2007 |
| INVENTOR(S) | : Luedtke |

Page 1 of 1

It is certified that error appears in the above-identified patent and that said Letters Patent is hereby corrected as shown below:

Column 12, line 51, delete "system 115" and insert therefor --system 15--.
Column 16, line 10, delete "system 115" and insert therefor --system 15--.
In Claim 2, column 21, line 35, delete "cedent" and insert therefor --cedant--.

Signed and Sealed this

Twenty-fifth Day of August, 2009

David J. Kappos
*Director of the United States Patent and Trademark Office*